(12) United States Patent
Yilmaz et al.

(10) Patent No.: US 9,479,372 B2
(45) Date of Patent: Oct. 25, 2016

(54) METHODS, SYSTEMS, AND MEDIA FOR DETERMINING WHETHER A SIGNAL OF INTEREST IS PRESENT

(71) Applicant: The Trustees of Columbia University in the City of New York, New York, NY (US)

(72) Inventors: Yasin Yilmaz, New York, NY (US); Xiaodong Wang, Ramsey, NJ (US); George V. Moustakides, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/383,815

(22) PCT Filed: Mar. 8, 2013

(86) PCT No.: PCT/US2013/030011
§ 371 (c)(1),
(2) Date: Sep. 8, 2014

(87) PCT Pub. No.: WO2013/134714
PCT Pub. Date: Sep. 12, 2013

(65) Prior Publication Data
US 2015/0103958 A1     Apr. 16, 2015

Related U.S. Application Data

(60) Provisional application No. 61/608,489, filed on Mar. 8, 2012.

(51) Int. Cl.
*H04L 27/06* (2006.01)
*H04L 27/14* (2006.01)
*H04W 16/14* (2009.01)

(52) U.S. Cl.
CPC ............. *H04L 27/14* (2013.01); *H04W 16/14* (2013.01)

(58) Field of Classification Search
CPC ....................................................... H04L 27/14
USPC ........................................................ 375/341
See application file for complete search history.

(56) References Cited

U.S. PATENT DOCUMENTS

| 6,018,543 A | 1/2000 | Blois et al. |
| 6,456,239 B1 | 9/2002 | Werb et al. |

(Continued)

OTHER PUBLICATIONS

Yilmaz et al, "Spectrum sensing via event-triggered sampling," Signals, Systems and Computers (ASILOMAR), 2011 Conference Record of the Forty Fifth Asilomar Conference on, vol., No., pp. 1420,1424, Nov. 6-9, 2011 [retrieved on May 1, 2013]. Retrieved from the Internet: http:llieeexplore.ieee.orglxplllogin.jsp?tp=&amumber=6190251>.*

(Continued)

*Primary Examiner* — Erin File
(74) *Attorney, Agent, or Firm* — Byrne Poh LLP

(57) ABSTRACT

Methods, systems, and media for determining whether a signal of interest is present are provided, in some embodiments, a system for determining whether a signal of interest is present is provided, the system comprising: at least one hardware processor that is configured to: receive at least one bit value containing information about whether the signal of interest is present from at least one transmitter, wherein the at least one bit value is transmitted from the at least one transmitter at a set of random time instances, and wherein the at least, one bit value is calculated without performing quantization; calculate a combined log-likelihood ratio based at least in part on the at least one bit value; and determine whether the signal of interest is present based at least in part on the combined log-likelihood ratio.

27 Claims, 7 Drawing Sheets

(56) References Cited

U.S. PATENT DOCUMENTS

| | | | |
|---|---|---|---|
| 6,873,662 | B2 | 3/2005 | Oh et al. |
| 6,915,123 | B1 | 7/2005 | Daudelin et al. |
| 7,065,351 | B2 | 6/2006 | Carter et al. |
| 7,327,795 | B2 | 2/2008 | Oprea |
| 7,327,800 | B2 | 2/2008 | Oprea et al. |
| 7,388,933 | B2 | 6/2008 | Oh et al. |
| 7,519,968 | B2 | 4/2009 | Koyama et al. |
| 7,747,224 | B2 | 6/2010 | McCallister et al. |
| 8,265,131 | B2 | 9/2012 | Ito et al. |
| 8,265,209 | B2 | 9/2012 | Kim |
| 8,379,709 | B2 | 2/2013 | Hui et al. |
| 8,422,595 | B2 | 4/2013 | Jiang |
| 8,738,053 | B2 | 5/2014 | Zhang et al. |
| 8,817,926 | B2 | 8/2014 | Hui et al. |
| 2002/0172166 | A1 | 11/2002 | Arslan et al. |
| 2005/0185666 | A1 | 8/2005 | Raya et al. |
| 2006/0189322 | A1 | 8/2006 | Conte et al. |
| 2006/0198352 | A1* | 9/2006 | Bruck .................... H04H 60/06 370/347 |
| 2007/0066229 | A1 | 3/2007 | Zhang et al. |
| 2007/0230335 | A1 | 10/2007 | Sang et al. |
| 2007/0254590 | A1 | 11/2007 | Lopez |
| 2008/0181252 | A1 | 7/2008 | Rofougaran |
| 2009/0285276 | A1* | 11/2009 | Heikkila ........................ 375/232 |
| 2010/0069013 | A1 | 3/2010 | Chaudhri et al. |
| 2010/0135226 | A1 | 6/2010 | Chandramouli et al. |
| 2010/0150258 | A1* | 6/2010 | van Zelst ....................... 375/267 |
| 2010/0316151 | A1* | 12/2010 | Fukawa et al. ................ 375/260 |
| 2011/0022342 | A1 | 1/2011 | Pandharipande et al. |
| 2011/0038272 | A1 | 2/2011 | Hadad et al. |
| 2011/0096858 | A1* | 4/2011 | Klimer .......................... 375/267 |
| 2011/0191281 | A1 | 8/2011 | Park et al. |
| 2011/0223910 | A1* | 9/2011 | Xin et al. ...................... 455/434 |
| 2012/0058794 | A1 | 3/2012 | Valentine |
| 2015/0023440 | A1* | 1/2015 | Suh et al. ...................... 375/267 |

OTHER PUBLICATIONS

Ask, J. et al., "Home Wi-Fi: Consumer Security Fears Help Drive Adoption of New Devices", Jupiter Research, Feb. 25, 2005, pp. 1-4.

Ask, J. et al., "Home Wireless Network Forecast", Jupiter Research, Oct. 29, 2004, pp. 1-4.

Ask, J. et al., "Public Wi-Fi: Capturing Paying Customers in an Increasingly Competitive Space", Jupiter Research, vol. 3, Mar. 23, 2006, pp. 1-22.

Ask, J. et al., "US Home Wireless Network Forecast, 2005 to 2010", Jupiter Research, Sep. 28, 2005, pp. 1-5.

Bianchi, G. and Tinnirello, I., "Kalman Filter Estimation of the Number of Competing Terminals in an IEEE 802.11 Network", In Proceedings of the 22nd Annual Joint Conference of the IEEE Computer and Communications Societies (INFOCOM '03), San Franciso, CA, US, Mar. 30-Apr. 3, 2003, pp. 1-9.

Bianchi, G., "Performance Analysis of the IEEE 802.11 Distributed Coordination Function", In IEEE Journal on Selected Areas in Communications, vol. 18, No. 3, Mar. 2000, pp. 535-547.

Buchegger, S. et al., "Nodes Bearing Grudges: Towards Routing Security, Fairness, and Robustness in Mobile Ad Hoc Networks", In Proceedings 10th Euromicro Workshop Parallel, Distributed and Network-Based Processing, Jan. 2002, pp. 403-410.

Buchegger, S. et al., "Performance Analysis of the CONFIDANT Protocol", In Proceedings of MobiHoc'02, Jun. 2002, pp. 226-236.

Buttyan, L. et al., "Report on a Working Session on Security in Wireless Ad Hoc Networks", Mobile Computing and Communications Review, Oct. 2002, vol. 6, No. 4, pp. 1-17.

Cagalj M, et al., "On Cheating in CSMA/CA Ad Hoc Networks", In Proceedings of IEEE INFOCOM, Mar. 2004, pp. 1-16.

Cardenas, A., et al., "Detection and Prevention of MAC Layer Misbehavior in Ad Hoc Networks", In SASN'04: Proceedings of the 2nd ACM Workshop on Security of Ad Hoc and Sensor Networks, Washington DC, US, Oct. 25-29, 2004, pp. 17-22.

Cardoso, L.S. et al., "Cooperative Spectrum Sensing Using Random Matrix Theory", in 3rd International Symposium on Wireless Pervasive Computing (ISWPC), May 7-9, 2008, pp. 334-338.

Cervin, A. and Henningsson, T., "Scheduling of Event-Triggered Controllers on a Shared Network", In Proceedings of the 47th IEEE Conference on Decision and Control (CDC '08), Cancún, MX, Dec. 9-11, 2008, pp. 3601-3606.

Chaudhari, S., et al., "Autocorrelation-Based Decentralized Sequential Detection of OFDM Signals in Cognitive Radios", In IEEE Transactions on Signal Processing, vol. 57, No. 7, Jul. 2009, pp. 2690-2700.

Chaudhari, S., et al., "Distributed Autocorrelation-Based Sequential Detection of OFDM Signals in Cognitive Radios", In Proceedings of the 3rd International Conference on Cognitive Radio Oriented Wireless Networks and Communications, Singapore, May 15-17, 2008, pp. 1-6.

Chen, H.S., et al., "Signature Based Spectrum Sensing Algorithms for IEEE 802.22 WRAN", In Proceedings of the IEEE Conference on Communicationsm, Glasgow, GB, Jun. 24-28, 2007, pp. 6487-6492.

European Telecommunications Standards Institute, "Spatial Channel Model for Multiple Input Multiple Output (MIMO) Simulations, 3GPP TR 25.966 V8.0.0", Jan. 30, 2009, pp. 1-42, available at: http://www.etsi.org/deliver/etsi_tr/125900_125999/125996/08.00.00_60/tr_125996v080000p.pdf.

Farhang-Boroujeny, B., "Filter Bank Spectrum Sensing for Cognitive Radios", IEEE Transactions on Signal Processing, vol. 56, No. 5, May 2008, pp. 1801-1811.

Fasano, G. and Franceschini, A., "A Multidimensional Version of the Kolmogorov-Smirnov Test", Monthly Notices of the Royal Astronomical Society, vol. 225, Mar. 1, 1987, pp. 155-170.

Fellouris, G. and Moustakides, G.V., "Decentralized Sequential Hypothesis Testing Using Asynchronous Communication", In IEEE Transactions on Information Theory, vol. 57, No. 1, Jan. 2011, pp. 534-548.

Font-Segura, J. and Wang, X., "GLRT-Based Spectrum Sensing for Cognitive Radio with Prior Information", In IEEE Transactions on Communications, vol. 58, No. 7, Jul. 2010, pp. 2137-2146.

Ganesan, G. and Li, Y., "Cooperative Spectrum Sensing in Cognitive Radio, Part 1: Two User Networks", In IEEE Transactions on Wireless Communications, vol. 6, No. 6, Jun. 2007, pp. 2204-2213.

Ghasemi, A. and Sousa, E., "Spectrum Sensing in Cognitive Radio Networks: Requirements, Challenges and Design Trade-Offs", IEEE Communications Magazine, vol. 46, No. 4, Apr. 2008, pp. 32-39.

Haykin, S., et al., "Spectrum Sensing for Cognitive Radio", In Proceedings of the IEEE, vol. 97, No. 5, May 2009, pp. 849-877.

Hernandez, M.A.L., et al., "New Spectral Estimation Based on Filterbank for Spectrum Sensing", IEEE International Conference on Acoustics, Speech and Signal Processing (ICASSP 2008), Mar. 31-Apr. 4, 2008, Las Vegas, NV, US, pp. 3509-3512.

International Patent Application No. PCT/US2007/011895, filed May 18, 2007.

International Patent Application No. PCT/US2011/064434, filed Dec. 12, 2011.

International Preliminary Report on Patentability dated Jun. 20, 2013 in International Patent Application No. PCT/US2011/064434.

International Preliminary Report on Patentability dated Sep. 9, 2014 in International Patent Application No. PCT/US2013/030011.

International Preliminary Report on Patentability dated Dec. 3, 2008 in International Patent Application No. PCT/US2007/011895.

International Search Report and Written Opinion dated Sep. 26, 2008 in International Patent Application No. PCT/US2007/011895.

International Search Report dated Mar. 1, 2012 in International Patent Application No. PCT/US2011/064434.

International Search Report dated May 20, 2013 in International Patent Application No. PCT/US2013/030011.

Jithin, K.S. and Sharma, V., "Novel Algorithms for Distributed Sequential Hypothesis Testing", In Proceedings of the 49th Annual Allerton Conference on Communication, Control, and Computing, Monticello, IL, US, Sep. 28-30, 2011, pp. 1529-1536.

(56) References Cited

OTHER PUBLICATIONS

Khamis, H., "The Delta-Corrected Kolmogorov-Smirnov Test for Goodness of Fit", In Journal of Statistical Planning and Inference, vol. 24, Mar. 1990, pp. 317-335.
Khamis, H., "The Two-Stage Delta-Corrected Kolmogorov-Smirnov Test", Journal of Applied Statistics, vol. 27, No. 4, Apr. 2000, pp. 439-450.
Kim, S.J. and Giannakis, G.B., "Sequential and Cooperative Sensing for Multi-Channel Cognitive Radios", In IEEE Transactions on Signal Processing, vol. 58, No. 8, Aug. 2010, pp. 4239-4253.
Kundargi, N. and Tewfik, A.H., "Doubly Sequential Energy Detection for Distributed Dynamic Spectrum Access", In Proceedings of the IEEE International Conference on Communications, Cape Town, ZA, May 23-27, 2010, pp. 1-5.
Kyasanur, P. et al., "Selfish MAC Layer Misbehavior in Wireless Networks," In IEEE Transactions on Mobile Computing, vol. 4, No. 5, Sep.-Oct. 2005, pp. 502-516.
Lai, L. et al., "Quickest Detection in Cognitive Radio: A Sequential Change Detection Framework", In Proceedings of the Global Telecommunications Conference, New Orleans, LA, US, Nov. 30-Dec. 4, 2008, pp. 1-5.
Lopez Toledo, A. and Wang, X., "Robust Detection of Selfish Misbehavior in Wireless Networks", In IEEE Journal on Selected Areas in Communications, vol. 25, No. 6, Aug. 2007, pp. 1124-1134.
Lopez Toledo, A. et al., "Adaptive Optimization of IEEE 802.11 DCF Based on Bayesian Estimation of the Number of Competing Terminals", IEEE Transactions on Mobile Computing, vol. 5, No. 9, Sep. 2006, pp. 1-14.
Lopez Toledo, A. et al., "Optimizing IEEE 802.11 DCF Using Bayesian Estimators of the Network State," In Proceedings of IEEE International Conference Acous., Speech, Sig. Proc. (ICASSP'05), Philadelphia, PA, US, vol. 5, Mar. 2005, pp. 933-936.
Lunze, J. and Lehmann, D., "A State-Feedback Approach to Event-Based Control", In Automatica, vol. 46, No. 1, Jan. 2010, pp. 211-215.
Ma, J. et al., "Signal Processing in Cognitive Radio", In Proceedings of the IEEE, vol. 97, No. 5, May 2009, pp. 805-823.
Ma, J. et al., "Soft Combination and Detection for Cooperative Spectrum Sensing in Cognitive Radio Networks", In IEEE Transactions on Wireless Communications, vol. 7, No. 11, Nov. 2008, pp. 4502-4507.
Mackenzie, A. and Wicker, S.B., "Stability of Multipacket Slotted Aloha with Selfish Users and Perfect Information", In Proceedings of IEEE Infocom'03, San Francisco, CA, US, Mar. 30-Apr. 3, 2003, pp. 1583-1590.
Mackenzie, A. et al., "Game Theory and the Design of Self-Configuring, Adaptive Wireless Networks", IEEE Communications Magazine, Nov. 2001, vol. 39, No. 11, pp. 126-131.
Massey, F. et al., "The Kolmogorov-Smirnov Test for Goodness of Fit", Journal of the American Statistical Association, Mar. 1951, vol. 46, No. 253, pp. 68-78.
Medepalli, K. et al., "Voice Capacity of IEEE 802.11a and 802.11g Wireless LANs," In Proceedings of Globecom, Dallas, TX, US, Nov. 29-Dec. 3, 2004, pp. 1459-1553.
Middleton, D., "Non-Gaussian Noise Models in Signal Processing for Telecommunications: New Methods an Results for Class A and Class B Noise Models", IEEE Transactions on Information Theory, vol. 45, No. 4, May 1999, pp. 1129-1149.
Miskowicz, M., "The Event-Triggered Sampling Optimization Criterion for Distributed Networked Monitoring and Control Systems", In Proceedings of the IEEE International Conference on Industrial Technology, vol. 2, Maribor, SI, Dec. 10-12, 2003, pp. 1083-1088.
Moustakides, G.V. et al., "A Numerical Approach to Performance Analysis of Quickest Change-Point Detection Procedures", In Statistica Sinica, vol. 21, No. 2, Apr. 2011, pp. 571-596.
Nguyen-Thanh, N., "Log-Likelihood Radio Optimal Quantizer for Cooperative Spectrum Sensing in Cognitive Radio", In IEEE Communications Letters, vol. 15, No. 3, Mar. 2011, pp. 317-319.
Office Action dated May 15, 2009 in U.S. Appl. No. 11/796,499.

Office Action dated Aug. 28, 2008 in U.S. Appl. No. 11/796,499.
Panchenko, D., "Section 13: Kolmogorov-Smirnov Test," In MIT Lecture Notes, Sep. 2006, pp. 83-90, available at: http://ocw.mit.edu/NR/rdonlyres/Mathematics/18-443Fall-2006/DB432998-421E-4FE3-8B59-FA3859D4F445/0/lecture14.pdf.
Peacock, J., "Two-Dimensional Goodness-of-Fit Testing in Astronomy", In Monthly Notices of the Royal Astronomical Society, vol. 202, Feb. 1983, pp. 615-627.
Penna, F., et al., "Cooperative Spectrum Sensing Based on the Limiting Eigenvalue Ratio Distribution in Wishart Matrices", In IEEE Communications Letters, vol. 13, No. 7, Jul. 2009, pp. 507-509.
Poor, H., "An Introduction to Signal Detection and Estimation", 2nd Ed. Springer-Verlag, Mar. 1998, pp. 1-410.
Quan, Z. et al., "Optimal Linear Cooperation for Spectrum Sensing in Cognitive Radio Networks", In IEEE Journal of Selected Topics in Signal Processing, vol. 2, No. 1, Feb. 2008, pp. 28-40.
Quan, Z. et al., "Optimal Spectral Feature Detection for Spectrum Sensing at Very Low SNR", In IEEE Transactions on Communications, vol. 59, No. 1, Jan. 2011, pp. 201-212.
Radosavac, S. et al., "A Framework for MAC Protocol Misbehavior Detection in Wireless Networks", In Proceedings of the 4th ACM Workshop on Wireless Security, Sep. 2, 2005, pp. 33-42.
Raya, M. et al., "DOMINO: A System to Detect Greedy Behavior in IEEE 802.11 Hotspots", In Proceedings of the 2nd International Conference on Mobile Systems, Applications and Services, Boston, MA, US, Jun. 6-9, 2004, pp. 84-97.
Sahai, A. and Cabric, D., "Spectrum Sensing: Fundamental Limits and Practical Challenges", Presentation, In Proceedings of the First IEEE International Symposium on New Frontiers in Dynamic Spectrum Access Networks (DYSPAN '05), Baltimore, MD, US, Nov. 8-11, 2005, pp. 1-138.
Salo, J. et al., "Channel Model Implementations of WINNER", TKK.fi, Apr. 10, 2007, pp. 1-3, available at http://www.tkk.fi/Units/Radio/scm/.
Sebastian, I. et al., "Home Wi-Fi Security: Understanding Consumer Behavior and Impact on Wi-Fi Adoption", Jupiter Research, Jun. 22, 2006, pp. 1-5.
Shei, Y. and Su, Y.T., "A Sequential Test Based Cooperative Spectrum Sensing Scheme for Cognitive Radios", In Proceeding of the IEEE 19th International Symposium on Personal, Indoor and Mobile Radio Communications (PIMRC '08), Cannes, FR, Sep. 15-18, 2008, pp. 1-5.
Sun, C. et al., "Cooperative Spectrum Sensing for Cognitive Radios under Bandwidth Constraints", In Proceedings of the IEEE Wireless Communications and Networking Conference (WCNC '07), Hong Kong, CN, Mar. 11-15, 2007, pp. 1-5.
Sutton, P.D. et al., "Cyclostationary Signatures in Practical Cognitive Radio Applications", IEEE Journal on Selected Areas in Communications, vol. 26, No. 1, Jan. 2008, pp. 13-24.
Tsitsiklis, J.N., "Extremal Properties of Likelihood-Ratio Quantizers", In IEEE Transactions on Communications, vol. 41, No. 4, Apr. 1993, pp. 550-558.
U.S. Appl. No. 60/810,002, filed May 31, 2006.
U.S. Appl. No. 61/422,114, filed Dec. 10, 2010.
Unnikrishnan, J. and Veeravalli, V.V., "Cooperative Spectrum Sensing and Detection for Cognitive Radio", In Proceedings of the Global Communications Conference (GLOBECOM '07), Washington, DC, US, Nov. 26-30, 2007, pp. 2972-2976.
Vercauteren, T. et al., "Batch and Sequential Bayesian Estimators of the Number of Active Terminals in an IEEE 802.11 Network", In IEEE Transactions on Signal Processing, vol. 55, No. 2, Feb. 2007, pp. 437-450.
Wald, A. and Wolfowitz, J., "Optimum Character of the Sequential Probability Ratio Test", In Annals of Mathematical Statistics, vol. 19, No. 3, Sep. 1948, pp. 326-339.
Wang, C., et al., "A New Collision Resolution Mechanism to Enhance the Performance of IEEE 802.11 DCF", In IEEE Transactions in Vehicular Technology, vol. 53, No. 4, Jul. 2004, pp. 1235-1246.
Written Opinion dated Mar. 1, 2012 in International Patent Application No. PCT/US2011/064434.

(56) References Cited

OTHER PUBLICATIONS

Written Opinion dated May 20, 2013 in International Patent Application No. PCT/US2013/030011.

Xin, Y. and Zhang, H., "A Simple Sequential Spectrum Sensing Scheme for Cognitive Radio", Technical Report, NEC Laboratories, May 28, 2009, pp. 1-29, available at: http://arxiv.org/abs/0905.4684.

Yang, X. et al., "Trace Based Semi-blind and Blind Spectrum Sensing Schemes for Cognitive Radio", In Proceedings of the IEEE Conference on Communications, Cape Town, ZA, May 23-27, 2010, pp. 1-5.

Yücek, T. and Arslan, H., "A Survey of Spectrum Sensing Algorithms for Cognitive Radio Applications", In IEEE Communications Surveys & Tutorials, vol. 11, No. 1, Jan. 2009, pp. 116-130.

Zahabi, S.J. and Tadaion, A.A., "Local Spectrum Sensing in Non-Gaussian Noise", In Proceedings of the 17th IEEE International Conference on Telecommunications, Doha, QA, Apr. 4-7, 2010, pp. 843-847.

Zeng, Y. and Liang, Y.C., "Eigenvalue-Based Spectrum Sensing Algorithms for Cognitive Radio", IEEE Transactions on Commununications, vol. 57, No. 6, Jun. 2009, pp. 1784-1793.

Zhang, G. et al., "Fast and Robust Spectrum Sensing via Kolmogorov-Smirnov Test", In IEEE Transactions on Communications, vol. 58, No. 12, Dec. 2010, pp. 3410-3416.

\* cited by examiner

METHODS, SYSTEMS, AND MEDIA FOR DETERMINING WHETHER A SIGNAL OF INTEREST IS PRESENT

CROSS REFERENCE TO RELATED APPLICATION

This application claims the benefit of U.S. Provisional Patent Application No. 61/608,489, filed Mar. 8, 2012, which is hereby incorporated by reference herein in its entirety.

TECHNICAL FIELD

Methods, systems, and media for determining whether a signal of interest is present are provided.

BACKGROUND

To cope with the increasing shortage in frequency spectrum due to the proliferation of wireless services, cognitive radio has been considered as an attractive technique to improve spectrum utilization for future wireless systems. In cognitive radio networks, primary users may have priority in using a given radio channel. Secondary users can access a ratio channel in such a way that they cause little performance degradation to the primary users. Therefore, secondary users need to decide the presence or absence of a primary user. Previous attempts at detecting the usage of a channel by one or more primary users have had limited performance, especially in low bandwidth contexts.

SUMMARY

Methods, systems, and media for determining whether a signal of interest is present are provided.

In accordance with some embodiments of the disclosed subject matter, systems for determining whether a signal of interest is present are provided, the systems comprising: at least one hardware processor that is configured to: receive at least one bit value containing information about whether the signal of interest is present from at least one transmitter, wherein the at least one bit value is transmitted from the at least one transmitter at a set of random time instances, and wherein the at least one bit value is calculated without performing quantization; calculate a combined log-likelihood ratio based at least in part on the at least one bit value; and determine whether the signal of interest is present based at least in part on the combined log-likelihood ratio.

In accordance with some embodiments of the disclosed subject matter, methods for determining whether a signal of interest is present are provided, the methods comprising: receiving, using a hardware processor, at least one bit value containing information about whether the signal of interest is present from at least one transmitter, wherein the at least one bit value is transmitted from the at least one transmitter at a set of random time instances, and wherein the at least one bit value is calculated without performing quantization; calculating, using the hardware processor, a combined log-likelihood ratio based at least in part on the at least one bit value; and determining, using the hardware processor, whether the signal of interest is present based at least in part on the combined log-likelihood ratio.

In accordance with some embodiments of the disclosed subject matter, non-transitory computer-readable media containing computer-executable instructions that, when executed by a processor, cause the processor to perform a method for determining whether a signal of interest is present are provided, the method comprising: receiving, using a hardware processor, at least one bit value containing information about whether the signal of interest is present from at least one transmitter, wherein the at least one bit value is transmitted from the at least one transmitter at a set of random time instances, and wherein the at least one bit value is calculated without performing quantization; calculating, using the hardware processor, a combined log-likelihood ratio based at least in part on the at least one bit value; and determining, using the hardware processor, whether the signal of interest is present based at least in part on the combined log-likelihood ratio.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
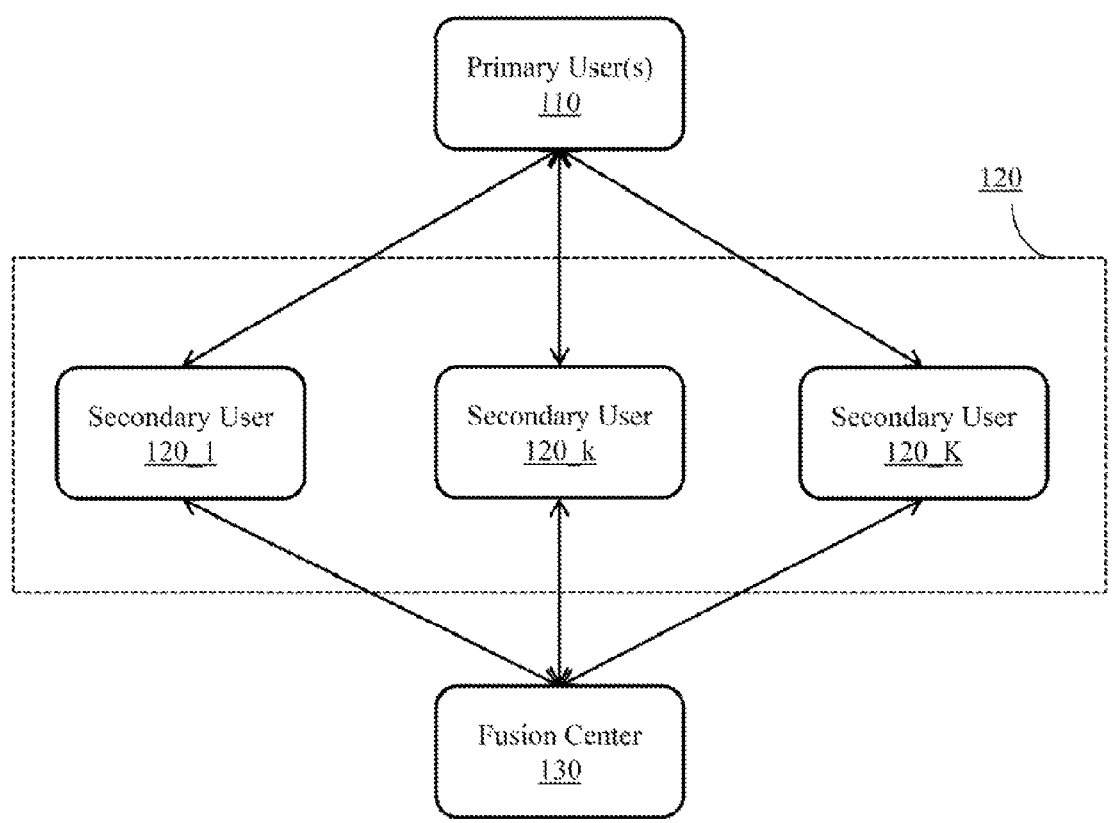
FIG. 1 is a generalized schematic diagram of an example of a distributed system in accordance with some embodiments of the disclosed subject matter.

In accordance with various embodiments, as described in more detail below, mechanisms for determining whether a signal of interest is present are provided. Such mechanisms can be used to determine the presence of a signal of a primary user by a secondary user in some embodiments.

In some embodiments, the presence of a signal of interest can be determined based on local observations made by one or more secondary users. For example, a secondary user can observe a signal containing information about the presence of the signal of interest. The secondary user can then transmit its observations to a fusion center. The fusion center can receive local observations from multiple secondary users synchronously or asynchronously. The fusion center can determine the presence or absence of the signal of interest based on the local observations. For example, the fusion center can make the determination by performing a binary hypothesis test. In a more particular example, the fusion center can solve a binary hypothesis test by waiting for and analyzing a fixed number of samples received from the secondary users. In another more particular example, the fusion center can solve a binary hypothesis test using a sequential test by analyzing the received observations sequentially as they arrive at the fusion center. More particularly, for example, the fusion center can make the determination using a sequential probability ratio test (SPRT).

In some embodiments, a secondary user can process the observed signal and determine the presence of a signal of interest based on the processing of the observed signal. The secondary user can also generate local sensing information which can indicate the presence or absence of a signal of interest. For example, a secondary user can make a local decision regarding the existence of the signal of interest based on the observed signal. The secondary user can encode the local decision result using one or multiple bits. As another example, a secondary user can generate local statistics based on the observed signal. In some embodiments, a secondary user can share its local sensing information with other secondary users.

In some embodiments, a secondary user can transmit the local sensing information to a fusion center. For example, a secondary user can transmit the local sensing information to the fusion center at a sequence of predetermined time instances. Alternatively or additionally, the secondary user can transmit the local sensing information to the fusion center at a sequence of random time instances. For example, the secondary user can transmit the local sensing information when a predetermined event occurs. More particularly, for example, the secondary user can make a local decision and transmit the local sensing information based on a SPRT. The fusion center can receive local sensing information from one or more secondary users asynchronously. The fusion center can then make a combined decision about the presence or absence of the signal of interest based on the local sensing information. For example, the fusion center can make a combined decision based on a SPRT.

Turning to FIG. 1, a generalized schematic diagram of an example of a distributed system 100 in accordance with some embodiments of the disclosed subject matter is shown. As illustrated, system 100 may include one or more primary users 110, one or more secondary users 120, and fusion center 130.

Primary user(s) 110 can provide a signal of interest. For example, primary user(s) 110 can include one or more radio sources that can provide signals containing spectrum usage information. More particularly, for example, primary user(s) 110 can include one or more primary transceivers that have priority in using a given radio channel. As another example, primary user(s) 110 can provide a signal indicating the existence of a target, a hazardous substance, a fire, air pollution, etc.

Secondary users 120 can include any suitable number of secondary users. For example, secondary users 120 can include K secondary users 120_1 to 120_K. In some embodiments, secondary users 120 can be randomly distributed within the coverage radius of fusion center 130. A secondary user can receive a signal containing information about the presence of a signal of interest. For example, a secondary user can receive a signal containing information about whether a primary transceiver is transmitting on a given channel. As another example, a secondary user can receive a signal containing information about the existence of a target, a hazardous substance, a fire, air pollution, etc.

A secondary user can also process the received signal and generate local sensing information which can indicate the presence or absence of a signal of interest. For example, a secondary user can make a local decision regarding the existence of the signal of interest and encode the decision result using one or multiple bits. As another example, a secondary user can generate local statistics based on the received signal. In some embodiments, multiple secondary users can observe the presence or absence of a signal of interest simultaneously and transmit the local sensing information to a fusion center synchronously or asynchronously.

Fusion center 130 can receive local observations or local sensing information from one or more secondary users. Fusion center 130 can make a combined decision on the existence of the signal of interest based on the local sensing information received from one or more secondary users. For example, fusion center 130 can make a combined decision based on a binary hypothesis test. In a more particular example, fusion center 130 can solve a binary hypothesis test by waiting for and analyzing a fixed number of samples of local sensing information received from the secondary users. In another more particular example, fusion center 130 can solve a binary hypothesis test using a sequential test by analyzing the samples of local sensing information sequentially as they arrive at the fusion center. More particular, for example, fusion center 130 can make the determination using a SPRT.

Figure 2:
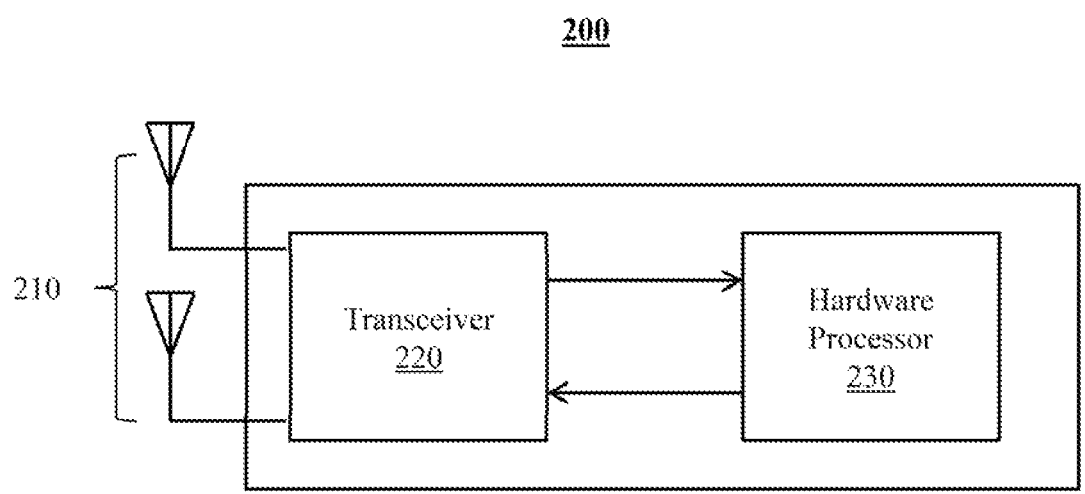
FIG. 2 is a generalized schematic diagram of an example of a secondary user in accordance with some embodiments of the disclosed subject matter.

Turning to FIG. 2, a generalized schematic diagram of an example of a secondary user 200 in accordance with some embodiments of the disclosed subject matter is shown. As illustrated, secondary user 200 can include one or more antennas 210, a transceiver 220, a hardware processor 230, and/or any other suitable components. In some embodiments, transceiver 220 can receive a signal containing information on the existence of a signal of interest through antennas 210. The transceiver 220 can provide the received signal to hardware processor 230. The hardware processor 230 can then process the received signal and generate local sensing information. The hardware processor 230 can also provide the local sensing information to transceiver 220. Transceiver 220 can transmit the local sensing information to other secondary users and fusion center 130 through antennas 210.

Figure 3:
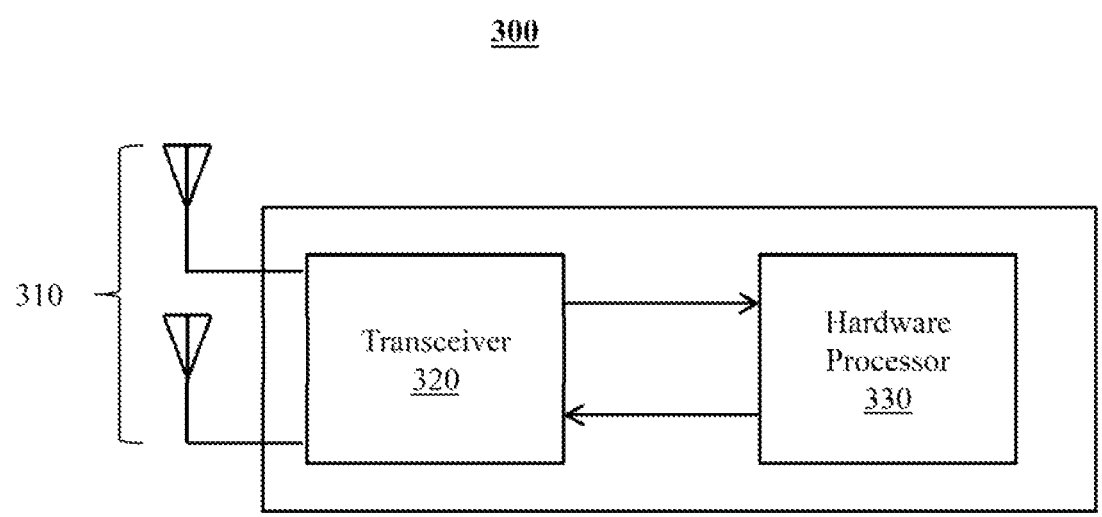
FIG. 3 is a generalized schematic diagram of an example of a fusion center in accordance with some embodiments of the disclosed subject matter.

Turning to FIG. 3, a generalized schematic diagram of an example of a fusion center 300 in accordance with some embodiments of the disclosed subject matter is shown. As illustrated, fusion center 300 can include one or more antennas 310, a transceiver 320, a hardware processor 330, and/or any other suitable components. In some embodiments, transceiver 320 can receive local sensing information from one or more secondary users through antennas 310. Alternatively or additionally, transceiver 320 can receive local observations from one or more secondary users through antennas 310. Transceiver 320 can provide hardware processor 330 with the local sensing information and local observations. Hardware processor 330 can make a combined decision regarding the existence of a signal of interest based on the local sensing information and local observations. Hardware processor 330 can also provide the combined decision result to transceiver 320. Transceiver 320 can then transmit the combined decision result to some or all of the secondary users through antennas 310.

In some embodiments, secondary user 200 and fusion center 300 can be implemented in any suitable devices. For example, they can be implemented in mobile computers, mobile telephones, mobile access cards, wireless routers, wireless access point and/or other suitable wireless device. In some embodiments, secondary user 200 and fusion center 300 can be used in any suitable sensor networks, such as cognitive radio networks, wireless communication networks, surveillance systems, radar systems, industrial quality control systems, robot networks, etc.

Each of transceivers 220 and 320 can include both a receiver and a transmitter in some embodiments. In some embodiments, each transceiver can include one or more multi-input multi-output (MIMO) transceivers where each includes multiple antennas (e.g., such as two transmit antennas and four receive antennas (some of which may also be transmit antennas)).

Each of hardware processors 230 and 330 can include any suitable hardware processor, such as a microprocessor, a micro-controller, digital signal processor, dedicated logic, and/or any other suitable circuitry.

Turning back to FIG. 1, in accordance with some embodiments, system 100 can be a cognitive radio system. Primary user(s) 110 can include one or more primary transceivers that have priority in using a given radio channel. Secondary users 120 can include one or more secondary transceivers that can use a radio channel if no primary transceiver is transmitting on the channel. For example, a secondary transceiver can determine that it should not use a radio channel when a primary transceiver is transmitting on the radio channel. Alternatively, a secondary transceiver can determine that it can use a radio channel if doing so would not interfere with the transmission of a primary transceiver.

In some embodiments, each of the K secondary users can receive a signal which can contain information about whether a primary transceiver is transmitting on a given radio channel. The secondary users can process the received signals and generate local sensing information based on the received signals. The secondary users can then transmit the local sensing information to fusion center 130.

Fusion center 130 can receive the local sensing information from one or more secondary users. Fusion center 130 can determine whether a primary transceiver is transmitting on a given radio channel based on the local sensing information. For example, fusion center 130 can determine whether a primary user is transmitting on a given channel by testing for the truth of two hypotheses $H_0$ and $H_1$. In a more particular example, fusion center 130 can accept hypothesis $H_0$ when it determines that a primary transceiver is not transmitting on the given channel. Alternatively, fusion center 130 can reject hypothesis $H_0$ and accept hypothesis $H_1$ when it determines that a primary transceiver is transmitting on the given channel. In some embodiments, when fusion center 130 receives local sensing information from one or more secondary users, it can stop receiving local sensing information from the secondary users and decide between two hypotheses $H_0$ and $H_1$. Alternatively, fusion center 130 can postpone the decision and receive more local sensing information from one or more secondary users.

In some embodiments, fusion center 130 can process the local sensing information received from multiple secondary users sequentially to make the hypothesis selection. Alternatively or additionally, fusion center 130 can wait until a predetermined number of samples of local sensing information before making the hypothesis selection.

In some embodiments, a secondary user can receive a signal containing information about whether a primary user is transmitting on a given radio channel through antennas 210 and transceiver 220. For example, a secondary user can receive a sampled discrete-time signal, such as a Nyquist-rate sampled discrete-time signal. More particularly, for example, at time t, the kth secondary user can observe a Nyquist-rate sampled discrete-time signal $\{y_t^k\}$, $k \in (0, K]$. In some embodiments, the sampled signals observed by secondary users 120_1 to 120_K can be independent. In some embodiments, the determination of whether a primary user is transmitting on a given radio channel can be made by performing the following binary hypothesis test:

$$H_0: \{y_1^1, \ldots, y_t^1\} \sim f_0^1; \{y_1^2, \ldots, y_t^2\} \sim f_0^2; \ldots ;$$
$$\{y_1^K, \ldots, y_t^K\} \sim f_0^K$$

$$H_1: \{y_1^1, \ldots, y_t^1\} \sim f_1^1; \{y_1^2, \ldots, y_t^2\} \sim f_1^2; \ldots ;$$
$$\{y_1^K, \ldots, y_t^K\} \sim f_1^K; \quad (1)$$

where ~ denotes "distributed according to" and $f_0^k$ and $f_1^k$ are the joint probability density functions of the signal received by the kth secondary user under hypotheses $H_0$ and $H_1$, respectively.

After receiving the sampled signal, a secondary user can process the received sampled signal and compute a local cumulative log-likelihood ratio (LLR) $L_t^k$ using the following equation:

$$L_t^k \triangleq \log \frac{f_1^k(y_1^k, \ldots, y_t^k)}{f_0^k(y_1^k, \ldots, y_t^k)}. \quad (2)$$

Alternatively or additionally, a secondary user can compute a local cumulative LLR recursively. For example, at time instant t, a secondary user can observe signal $y_t^k$ which can give rise to an LLR increment $l_t^k$. The secondary user can then compute a local cumulative LLR recursively based on the LLR increment. More particularly, for example, a secondary user can compute a local cumulative LLR using the following equation:

$$L_t^k = L_{t-1}^k + l_t^k = \sum_{n=1}^{t} l_n^k, \quad (3)$$

where $l_t^k$ can be defined as $$l_t^k \triangleq \log \frac{f_1^k(y_t^k \mid y_1^k, \ldots, y_{t-1}^k)}{f_0^k(y_t^k \mid y_1^k, \ldots, y_{t-1}^k)}. \quad (4)$$

In equation (4), $f_i^k(y_t^k | y_1^k, \ldots, y_{t-1}^k)$ denotes the conditional probability density function of $y_t^k$ given the past local signal samples under hypothesis $H_i$.

In some embodiments, the samples of the received signal in each secondary user can be independent and identically distributed (i.i.d.). In that case, a secondary user can compute an LLR increment $l_t^k$ based on the following equation:

$$l_t^k \triangleq \log \frac{f_1^k(y_t^k)}{f_0^k(y_t^k)}, \quad (5)$$

where $f_i^k$ represents the probability density function of a signal sample in the kth secondary user under hypothesis $H_i$.

Whether a primary user is transmitting on a channel can be determined in any suitable manner. For example, in some embodiments, mathematical models of sampled signals from a channel when a transmitter is present and when a transmitter is not present can be formed, and those models used to perform analysis on a channel under test.

In some embodiments, when a primary user is transmitting on a given channel, secondary user 200 can receive a signal $y_t^k = x_t^k + w_t^k$, where $x_t^k$ is the received primary user signal and $w_t^k \sim N_c(0, \sigma_w^2)$ is the additive white Gaussian noise. The received signal-to-noise ratio (SNR) at the secondary user can be $$\frac{E[|x_t^k|^2]}{\sigma_w^2} = \frac{\theta_k}{2}, \text{ where } \theta_k \triangleq \frac{E[|x_t^k|^2]}{\sigma_w^2/2}.$$

The determination of whether a primary user is transmitting on a given channel can be performed by testing for the truth of two hypotheses:

$$H_0: \gamma_t^k \sim \chi_2^2$$

$$H_1: \gamma_t^k \sim \chi_2^2(\theta_k), \quad (6)$$

where $\chi_2^2$ denotes a central chi-squared distribution with two degrees of freedom, $\chi_2^2(\theta_k)$ denotes a non-central chi-squared distribution with two degrees of freedom and noncentrality parameter $\theta_k$, and $$\gamma_t^k \triangleq \frac{|y_t^k|^2}{\sigma_w^2/2}.$$

A secondary user can compute an LLR increment $l_t^k$ using the probability density functions of central and non-central chi-squared distributions. More particularly, for example, a secondary user can calculate an LLR increment using the following equation:

$$l_t^k = \log \frac{\frac{1}{2}\exp\left(-\frac{\gamma_t^k + \theta_k}{2}\right) I_0\left(\sqrt{\theta_k \gamma_t^k}\right)}{\frac{1}{2}\exp\left(-\frac{\gamma_t^k}{2}\right)} = \log I_0\left(\sqrt{\theta_k \gamma_t^k}\right) - \frac{\theta_k}{2}. \quad (7)$$

where $I_0(x)$ is the modified Bessel function of the first kind and $0^{th}$ order.

In some embodiments, a secondary user can determinate whether a primary user is transmitting on a given channel based on a hypothesis testing formulation that includes discriminating between the channel's white Gaussian noise and the correlated primary user signal. The spectral shape of the primary user signal can be determined in advance using any suitable technique. This spectral shape can be approximated by a p-th order auto-regressive (AR) model.

In a more particular example, the secondary user can determine whether the primary user is transmitting on a given channel based on the following hypothesis testing formulation:

$$H_0: y_t^k = w_t^k$$

$$H_1: y_t^k = \sum_{i=1}^{p} a_i y_{t-i}^k + v_t^k, \quad (8)$$

where $\{w_t^k\}$ and $\{v_t^k\}$ are independent and identically distributed sequences with $w_t^k \sim N_c(0, \sigma_w^2)$ and $v_t^k \sim N_c(0, \sigma_v^2)$, and where $a_1, \ldots, a_p$ are the AR model coefficients. The secondary user can compute a local LLR increment $l_t^k$ corresponding to the signal $y_t^k$ observed at time t using the Gaussian probability density function. More particularly, for example, a secondary user can calculate an LLR increment using the following function:

$$l_t^k = \log \frac{f_1^k(y_t^k | y_{t-1}^k, \ldots, y_{t-p}^k)}{f_0^k(y_t^k)} = \log \frac{\frac{1}{\pi \sigma_v^2}\exp\left[-\frac{1}{\sigma_v^2}\left|y_t^k - \sum_{i=1}^{p} a_i y_{t-i}^k\right|^2\right]}{\frac{1}{\pi \sigma_w^2}\exp\left(-\frac{1}{\sigma_w^2}|y_t^k|^2\right)} \quad (9)$$

$$= \frac{1}{\sigma_w^2}|y_t^k|^2 - \frac{1}{\sigma_v^2}\left|y_t^k - \sum_{i=1}^{p} a_i y_{t-i}^k\right|^2 + \log \frac{\sigma_w^2}{\sigma_v^2}.$$

In some embodiments, a secondary user can receive a signal $y_t^k = h_t^k s_t + w_t^k$, where $h_t^k \sim N_c(0, \rho_w^2)$ is the fading channel response between the primary user and the secondary user, $s_t$ is the digitally modulated signal of the primary user drawn from a certain modulation, with $E[|s_t|^2]=1$, and $w_t^k \sim N_c(0, \sigma_w^2)$ is the additive white Gaussian noise. The secondary user can then determine whether a primary user is transmitting on a given channel based on a hypothesis testing between two Gaussian signals. In a more particular example, under both fast fading and slow fading conditions, a secondary user can determine whether a primary user is transmitting on a given channel based on the following hypothesis test:

$$H_0: y_t^k \sim N_c(0, \sigma_w^2),$$

$$H_1: y_t^k \sim N_c(0, \rho_k^2 + \sigma_w^2). \quad (10)$$

The secondary user can also compute the local LLR increment $l_t^k$ corresponding to the observed signal $y_t^k$ using the Gaussian probability density function. For example, the secondary user can compute a local LLR increment using the following equation:

$$l_t^k \triangleq \log \frac{f_1^k(y_t^k)}{f_0^k(y_t^k)} = \quad (11)$$

$$\log \frac{\frac{1}{\pi(\rho_w^2 + \sigma_w^2)}\exp\left(\frac{|y_t^k|^2}{\rho_k^2 + \sigma_w^2}\right)}{\frac{1}{\pi \sigma_w^2}\exp\left(\frac{|y_t^k|^2}{\sigma_w^2}\right)} = \frac{\rho_k^2}{\sigma_w^2(\rho_k^2 + \sigma_w^2)}|y_t^k|^2 + \log \frac{\sigma_w^2}{\rho_k^2 + \sigma_w^2}.$$

After computing a local cumulative LLR as described above, a secondary user can transmit the local cumulative LLR to fusion center 130. In some embodiments, a secondary user can transmit multiple local cumulative LLRs to the center unit at the Nyquist-rate of the signal through transceiver 220 and antennas 210. Fusion center 130 can receive local cumulative LLRs from one or more secondary users through antennas 310 and transceiver 320. More particularly, for example, fusion center 130 can receive local cumulative LLRs from secondary users 120_1 to 120_K synchronously or asynchronously.

The fusion center can also compute a combined cumulative LLR based on the local cumulative LLRs received from one or more secondary users. For example, the fusion center can compute a combined cumulative LLR using the following equation:

$$L_t = \sum_{k=1}^{K} L_t^k \quad (12)$$

where $L_t^k$ denotes the local cumulative LLR of the sampled signal received from the kth secondary user at time instant t.

Fusion center 130 can determine whether it should decide between two hypotheses $H_0$ and $H_1$ based on the combined cumulative LLR or postpone the decision and receive more local cumulative LLRs from one or more secondary users 120. For example, fusion center 130 can make the determination based on a sequential test consisting of a pair (T, $\delta_T$), where T is a stopping time when fusion center 130 stops receiving more local sensing information from secondary users 120 and $\delta_T$ is a selection rule that selects one of the two hypotheses based on the information available up to the time instant T. In a more particular example, fusion center 130 can make the determination by minimizing the decision time T, that is, $$\min_{T,\delta_T} E_0[T], \text{and/or } \min_{T,\delta_T} E_1[T]. \tag{13}$$

Alternatively or additionally, fusion center 130 can make the hypothesis selection by solving suitable constraints on the Type-I and Type-II error probabilities, namely $$P_0(\delta_T=1)\le\alpha \text{ and } P_1(\delta_T=0)\le\beta, \tag{14}$$

where $P_i(\bullet)$ and $E_i[\bullet]$ (i=0, 1) denote probability and the corresponding expectation under hypothesis i; and levels $\alpha$, $\beta \in (0, 1)$ are parameters specified by the designer. It should be noted that $\alpha$ and $\beta$ can have any suitable values. For example, the value of $\alpha$ and the value of $\beta$ can be within the interval $[10^{-1}, 10^{-10}]$. More particularly, for example, the value of $\alpha$ and the value of $\beta$ can be equal to $10^{-6}$.

In some embodiments, fusion center 130 can make the hypothesis decision by minimizing in equation (13) each $E_i[T]$ (i=0, 1) over the pairs (T, $\delta_T$) that satisfy the two constraints provided in (14). For example, fusion center 130 can solve the constrained optimization problems defined in (13) and (14) simultaneously. More particularly, for example, fusion center 130 can decide between two hypotheses $H_0$ and $H_1$ based on the combined cumulative LLR $L_t$ or postpone the decision and receive more local sensing information from secondary users 120 using a Sequential Probability Ratio Test (SPRT). In some embodiments, the SPRT can include a pair (S, $\delta_S$), which can be defined as follows:

$$S = \inf\{t > 0: L_t \notin (B, A)\}; \delta_S = \begin{cases} 1, & \text{if } L_S \ge A, \\ 0, & \text{if } L_S \le -B, \end{cases} \tag{15}$$

where A, B>0. In some embodiments, the two thresholds A and −B can be selected through simulations so that the SPRT satisfies the two constraints defined in (14). Alternatively or additionally, thresholds A and −B can be selected through simulations based on a suitable randomized test that can meet the two constraints in (14) without taking any samples (i.e., delay equal to 0). In some embodiments, these simulations to find proper values for A, −B can be performed once offline (e.g., before the sensing scheme starts, for each sensing environment). At time instant t, fusion center 130 can compare the combined cumulative LLR $L_t$ with two thresholds −B and A and determine whether $L_t$ is within the interval (−B, A). In response to determining that $L_t$ is within the interval (−B, A), the fusion center can receive more local sensing information from secondary users 120 and update $L_t$ using equation (12). Alternatively, in response to determining that $L_t$ is not within the interval (−B, A), fusion center 130 can stop accepting more local sensing information from secondary users 120 and decide between two hypotheses $H_0$ and $H_1$ based on equation (15). More particularly, for example, at time instant S, fusion center 130 can determine that the combined cumulative LLR $L_S$ is not within the interval (−B, A). Fusion center 130 can then accept hypothesis $H_0$ and determine that a primary user is not transmitting on the given channel if $L_S$ is less than or equal to −B. Alternatively, the fusion center can accept then hypothesis $H_1$ and determine that a primary user is transmitting on the given channel if $L_S$ is greater than or equal to A.

As described above, a secondary user can transmit the local sensing information to fusion center 130 at the Nyquist-rate of the signal. In accordance with some embodiments, a secondary user can also transmit the local sensing information to fusion center 130 at a lower rate. For example, a secondary user can produce a local cumulative LLR process $\{L_t^k\}$. The secondary user can uniformly sample the process $\{L_t^k\}$ at a predetermined period. As another example, a secondary user can sample the process $\{L_t^k\}$ at a series of random times. More particularly, for example, a secondary user can sample the process $\{L_t^k\}$ when $L_t^k$ is greater than a predetermined threshold.

In some embodiments, a secondary user can transmit its local cumulative LLR at time instants T, 2T, ..., mT, ..., where the period $T \in \mathbb{N}$. The secondary user can also quantize the local cumulative LLRs using a finite number of quantization levels. More particularly, for example, during time instances (m−1)T+1, ..., mT, a secondary user can compute an incremental LLR corresponding to the observations $y_{(m-1)T+1}^k, \ldots, y_{mT}^k$ using the following equation:

$$\lambda_{mT}^k \triangleq L_{mT}^k - L_{(m-1)T}^k = \sum_{t=(m-1)T+1}^{mT} l_t^k, \tag{16}$$

where $l_t^k$ is the local LLR increment corresponding to observation $y_t^k$ as defined in equation (4).

The secondary user can then quantize the incremental LLR $\lambda_{mT}^k$ using a finite number $\tilde{r}$ of quantization levels. For example, the secondary user can perform uniform quantization on the incremental LLR $\lambda_{mT}^k$. In a more particular example, it can be assumed that the LLRs of all observations are uniformly bounded by a finite constant $\Phi$ across time and across all the secondary users, i.e., $$\max_{k,t}|l_t^k|<\Phi<\infty. \tag{17}$$

Using equations (16) and (17), the secondary user can conclude that $|\lambda_{mT}^k|<T\Phi$. The secondary user can divide the interval $(-T\Phi, T\Phi)$ uniformly into $\tilde{r}$ subintervals and assign the mid-value of each subinterval as the quantized value corresponding to the incremental LLR $\lambda_{mT}^k$. For example, the secondary user can calculate a quantized value $\tilde{\lambda}_{mT}^k$ corresponding to the incremental LLR $\lambda_{mT}^k$ using the following equation:

$$\tilde{\lambda}_{mT}^k = -T\Phi + \frac{T\Phi}{\tilde{r}} + \left\lfloor \frac{\tilde{r}(\lambda_{mT}^k + T\Phi)}{2T\Phi} \right\rfloor \frac{2T\Phi}{\tilde{r}}. \tag{18}$$

In some embodiments, the quantization error satisfies the following constraint:

$$|\lambda_{mT}^k - \tilde{\lambda}_{mT}^k| < \frac{T\Phi}{\tilde{r}}. \tag{19}$$

In accordance with some embodiments, the secondary user can transmit the value of $\tilde{\lambda}_{mT}^k$ to fusion center 130. Alternatively or additionally, the secondary user can transmit to fusion center 130 the index of $\tilde{\lambda}_{mT}^k$ that can be encoded with $\log_2 \tilde{r}$ bits.

Fusion center 130 can receive quantization information including the quantized incremental LLRs from K secondary users, synchronously. Fusion center 130 can calculate a combined running LLR based on the quantized information. For example, fusion center 130 can calculate a combined running LLR using the following equation:

$$\tilde{L}_{mT}=\tilde{L}_{(m-1)T}+\Sigma_{k=1}^{K}\tilde{\lambda}_{mT}^{k}. \quad (20)$$

Fusion center 130 can also determine whether it should decide between two hypotheses $H_0$ and $H_1$ based on the combined running LLR or take more local sensing information from the secondary users and update the combined running LLR. For example, fusion center 130 can make the determination using a sequential test. In a more particular example, the sequential test can include a pair $(\tilde{S}, \delta_{\tilde{S}})$, which can be defined as:

$$\tilde{S}=T\mathcal{M};\mathcal{M}=\inf\{m>0:\tilde{L}_{mT}\notin(-\tilde{B},\tilde{A})\};\delta_{\tilde{S}}=\begin{cases}1, & \text{if } \tilde{L}_{\tilde{S}}\geq\tilde{A},\\ 0, & \text{if } \tilde{L}_{\tilde{S}}\leq-\tilde{B},\end{cases} \quad (21)$$

where $\tilde{A}$, $\tilde{A}>0$. In accordance with some embodiments, thresholds $\tilde{A}$ and $\tilde{A}$ can be selected through simulations so that the sequential test satisfies the two constrains defined in (14). At time instant t, fusion center 130 can compare the combined running LLR with two thresholds $-\tilde{B}$ and $\tilde{A}$ and determine whether the combined running LLR is within the interval $(-\tilde{B},\tilde{A})$. In response to determining that the combined running LLR is within the interval $(-\tilde{B},\tilde{A})$, the fusion center can receive more local sensing information from secondary users 120 and update the combined running LLR using equation (20). Alternatively, in response to determining that the combined running LLR is not within $(-\tilde{B},\tilde{A})$, the fusion center can stop accepting new local sensing information from the secondary users and decide between two hypotheses $H_0$ and $H_1$ based on equation (21). For example, at time instant M, the center unit can determine that the combined cumulative LLR is not within $(-\tilde{B},\tilde{A})$. The fusion center can then accept hypothesis $H_0$ and determine that a primary user is not transmitting on the given channel if the combined running LLR is less than or equal to $-\tilde{B}$. Alternatively, the fusion center can then accept hypothesis $H_1$ and determine that a primary user is transmitting on the given channel if the combined running LLR is greater than or equal to $\tilde{A}$.

Figure 4:
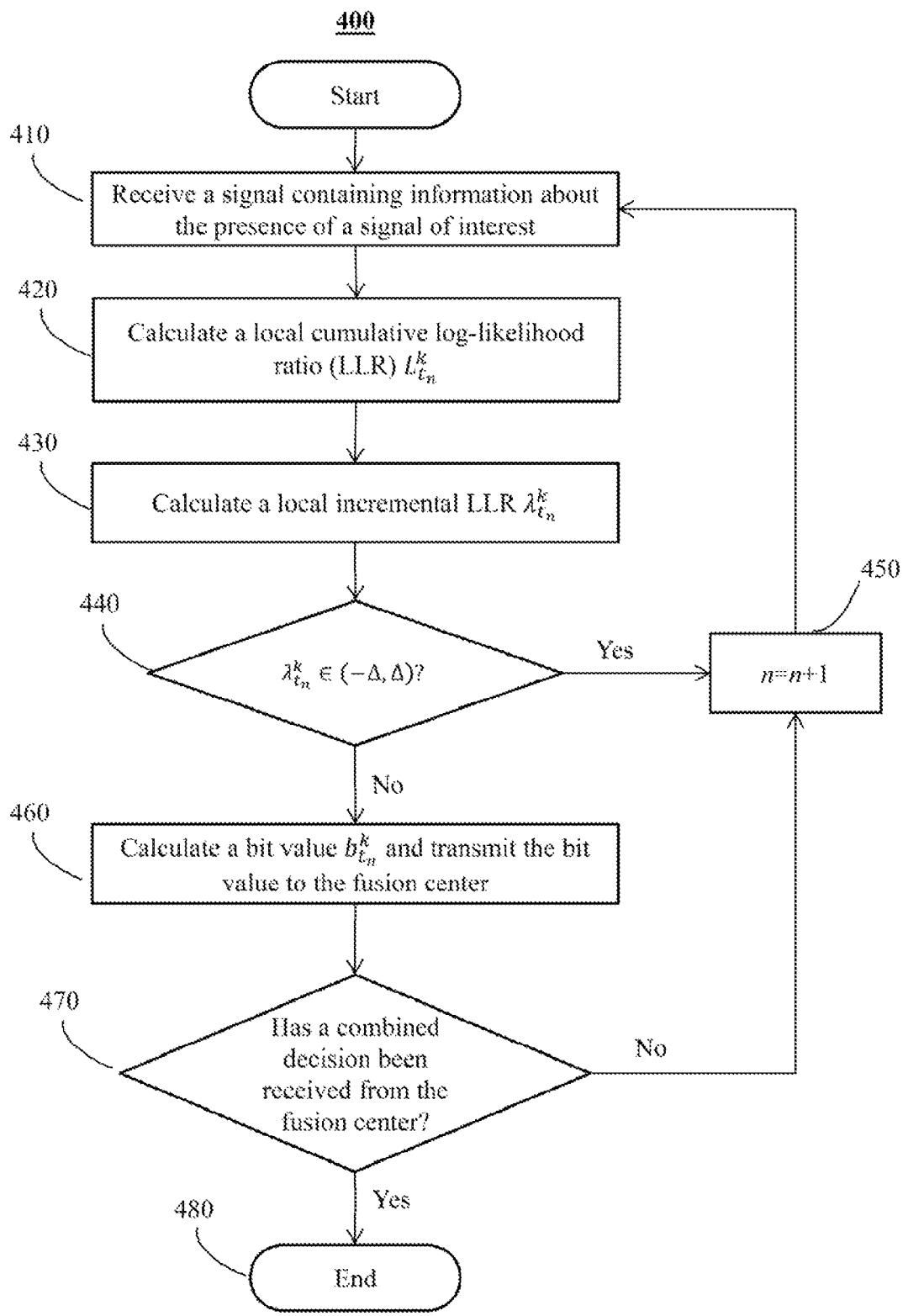
FIG. 4 is a flow chart of an example of a process for detecting a signal of interest at a secondary user using a level-triggered sequential probability ratio test in accordance with some embodiments of the disclosed subject matter.

Turning to FIG. 4, a flow chart of an example of a process for detecting a signal of interest using a level-triggered sequential probability ratio test in accordance with some embodiments of the disclosed subject matter is illustrated. In some embodiments, process 400 can be implemented by a secondary user as illustrated in FIGS. 1 and 2.

As shown, process 400 can begin by receiving a signal which contains information about the presence of a signal of interest at 410. For example, at time t, secondary user 200 can observe a signal $\{y_t^k\}$, where k denotes the index of the secondary user. More particularly, for example, secondary user 200 can receive a sampled signal through antennas 210 and transceiver 220. In some embodiments, signal $\{y_t^k\}$ can be described using mathematical models as described above in connection with equations (6)-(11).

At 420, secondary user 200 can calculate local cumulative LLRs corresponding to signal $\{y_t^k\}$. For example, at time instant $t_n$, secondary user 200 can observe signal $y_{t_n}^k$ through antennas 210 and transceiver 220. Hardware processor 230 can calculate a local cumulative LLR $L_{t_n}^k$ corresponding to observation $y_{t_n}^k$. More particularly, for example, hardware processor 230 can calculate a local cumulative LLR based on an LLR increment $l_t^k$ as described above in connection with equations (3)-(11).

At 430, secondary user 200 can calculate a local incremental LLR corresponding to signal $\{y_t^k\}$. For example, at time instant $t_n$, hardware processor 230 can calculate an incremental LLR $\lambda_n^k$ using the following equation:

$$\lambda_n^k \triangleq L_{t_n}^k - L_{t_{n-1}}^k. \quad (22)$$

In a more particular example, hardware processor 230 can calculate an incremental LLR based on an LLR increment. In some embodiments, hardware processor 230 can calculate an LLR increment as described above in connection with equations (3)-(11). More particularly, for example, hardware processor 230 can calculate $\lambda_n^k$ using the following equation:

$$\lambda_n^k = L_t^k - L_{t_{n-1}}^k = \Sigma_{j=t_{n-1}+1}^{k} \eta_j^k \quad (23)$$

Next, at 440, secondary user 200 can determine whether $\lambda_n^k$ is within the interval $(-\Delta, \Delta)$. For example, hardware processor 230 can compare incremental LLR $\lambda_n^k$ with thresholds $-\Delta$ and $\Delta$ and determine whether $\lambda_n^k$ is between the two thresholds. In response to determining that $\lambda_n^k$ is within the interval $(-\Delta, \Delta)$, hardware processor 230 can increment the time index n at 450, and then process 400 can loop back to 410 so that secondary user 200 can receive new observations through antennas 210 and transceiver 220.

Alternatively, in response to determining that $\lambda_n^k$ is not within the interval $(-\Delta, \Delta)$, secondary user 200 can calculate a bit value which can represent whether the incremental LLR $\lambda_n^k$ crosses the upper threshold $\Delta$ or the lower threshold $-\Delta$. For example, hardware processor 230 can calculate a bit value $b_n^k$ based on comparison of $\lambda_n^k$ and thresholds $-\Delta$ and $\Delta$. More particularly, for example, $b_n^k$ can be equal to 1 when hardware processor 230 determines that $\lambda_n^k$ is equal to or greater than the upper threshold $\Delta$. Alternatively, $b_n^k$ can be equal to $-1$ when hardware processor 230 determines that $\lambda_n^k$ is equal to or less than the lower threshold $-\Delta$.

As another example, the bit value $b_n^k$ can be a sign value. More particularly, for example, hardware processor 230 can calculate a bit value $b_n^k$ using the following equation:

$$b_n^k = \text{sign}(\lambda_n^k), \quad (24)$$

where $\lambda_n^k$ is the incremental LLR defined in equation (22). Equation (24) can result in $b_n^k$ being equal to 1 if $\lambda_n^k$ is greater than zero, and being equal to $-1$ if $\lambda_n^k$ is less than zero.

Secondary user 200 can then transmit $b_n^k$, to fusion center 130. For example, secondary user 200 can transmit a sequence of bits $\{b_n^k\}$ at a sequence of random times $\{t_n^k\}$. More particularly, for example, the sequence of random times $\{t_n^k\}$ can be defined as follows:

$$t_n^k = \inf\{t > t_{n-1}^k : L_{t_n}^k - L_{t_{n-1}}^k \notin (-\Delta, \Delta)\}, t_0^k = 0, L_0^k = 0. \quad (25)$$

In some embodiments, parameter $\Delta$ can be selected to control the average sampling periods $E_i[t_n^k - t_{n-1}^k]$, i=0, 1. In some embodiments, the two average periods $E_0$ and $E_1$ can coincide to a predetermined value T. For example, in accordance with some embodiments, the LLR corresponding to each observation can be substantially symmetric around its mean under the two hypotheses. As a result, the two average periods under the two hypotheses can be substantially the same.

As described above in connection with equation (23), $L_t^k - L_{t_{n-1}}^k = \Sigma_{j=t_{n-1}+1}^{t} \eta_j^k$. Accordingly, in some embodiments, equation (25) can rewritten as:

$$t_n^k = \inf\{t > t_{n-1}^k : \Sigma_{j=t_{n-1}+1}^{t} \eta_j^k \notin (-\Delta, \Delta)\}. \quad (26)$$

Next, at 470, secondary user 200 can determine whether a combined decision has been received from fusion center 130. In response to determining that a combined decision has not been received from fusion center 130, secondary user 200 can perform step 450 and increment the time index n and loop back to 410. Alternatively, in response to determining that a decision result has been received from fusion center 130, process 400 can end at 480.

It should be understood that some of the above steps of the flow diagram of FIG. 4 can be executed or performed in an order or sequence other than the order and sequence shown and described in the figure. Also some of the above steps of the flow diagram of FIG. 4 may be executed or performed well in advance of other steps, or may be executed or performed substantially simultaneously or in parallel to reduce latency and processing times.

Figure 5:
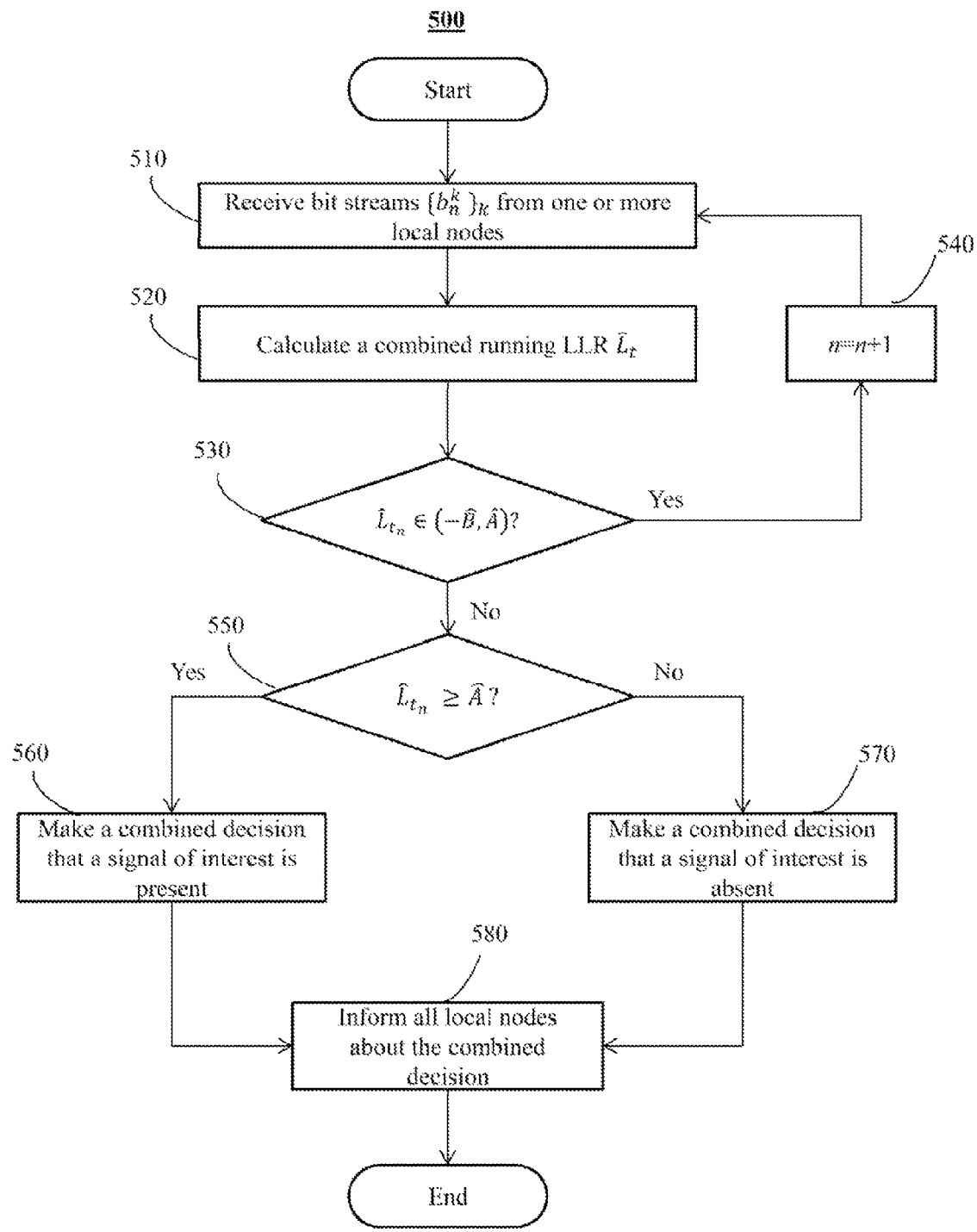
FIG. 5 is a flow chart of an example of a process for detecting a signal of interest at a fusion center using a level-triggered sequential probability ratio test in accordance with some embodiments of the disclosed subject matter.

Turning to FIG. 5, a flow chart of an example of a process for determining the presence of a signal of interest using a level-triggered sequential probability ratio test (SPRT) in accordance with some embodiments is shown. In some embodiments, process 500 can be implemented by a fusion center as illustrated in FIGS. 1 and 3.

As shown, process 500 can begin by receiving bit streams $\{b_n^k\}_k$ from one or more secondary users at 510. For example, fusion center 300 can asynchronously receive bit streams $\{b_n^k\}_k$ from multiple secondary users through antennas 310 and transceiver 320.

Next, at 520, fusion center 300 can calculate a combined running LLR. For example, hardware processor 330 can calculate a combined running LLR by adding all the bits received from all the secondary users up to time t and normalizing the result with $\Delta$. More particularly, for example, fusion center 300 can approximate the local incremental LLR $\lambda_n^k$ at time instants $\{t_n^k\}$ using the following equation:

$$\lambda_n^k = b_n^k \Delta. \qquad (27)$$

Using equation (15), $\lambda_n^k$ can be calculated as follows:

$$L_{t_n}^k = \Sigma_{j=1}^n \lambda_j^k. \qquad (28)$$

Using equations (27) and (28), the local cumulative LLR $L_{t_n}^k$ can be approximated at $\{t_n^k\}$ using the following equation:

$$\hat{L}_{t_n}^k = \Sigma_{j=1}^n \hat{\lambda}_j^k = \Sigma_{j=1}^n b_j^k \Delta = \hat{L}_{t_{n-1}}^k + b_n^k \Delta. \qquad (29)$$

In accordance with some embodiments, $\{L_t^k\}$ can be a continuous process with continuous paths. And $L_{t_n}^k$ can be equal to $L_{t_n}^k$ when the local incremental LLR $\lambda_n^k$ is equal to one of the two thresholds $\pm\Delta$ at the random time instants $\{t_n^k\}$.

In some embodiments, at time instant t, hardware processor 330 can calculate a combined running LLR using the following equation:

$$\hat{L}_t = \Sigma_{k=1}^K \hat{L}_t^k = \Delta \Sigma_{k=1}^K \Sigma_{n:t_n^k \leq t} b_n^k. \qquad (30)$$

Alternatively or additionally, hardware processor 330 can compute a combined running LLR recursively using the following equation:

$$\hat{L}_{t_n} = \hat{L}_{t_{n-1}} + b_n \Delta, \qquad (31)$$

where $t_n$ denotes the nth communication instant of the fusion center with any secondary user; and $b_n$ denotes the bit value(s) received at time instant $t_n$. In some embodiments, at a particular time instant, fusion center 300 can receive more than one bit from multiple secondary users simultaneously. It can then process each bit separately following any random or fixed ordering of the secondary users.

In some embodiments, fusion center 300 can determine whether it should decide between the two hypotheses $H_0$ and $H_1$ or receive more bit streams from one or more secondary users. For example, hardware processor 330 can make the determination using a sequential test. More particularly, for example, the sequential test can include a pair $(\hat{S}, \hat{\delta}_{\hat{S}})$, which can be defined as:

$$\hat{S} = t_N; \mathcal{N} = \inf\{n > 0 : \hat{L}_{t_n} \notin (-\hat{B}, \hat{A})\}; \hat{\delta}_{\hat{S}} = \begin{cases} 1, & \text{if } \hat{L}_{\hat{S}} \geq \hat{A}, \\ 0, & \text{if } \hat{L}_{\hat{S}} \leq -\hat{B}, \end{cases} \qquad (32)$$

where $\hat{S}$ counts in physical time units and N counts in number of messages transmitted from the secondary users to the fusion center. In some embodiments, thresholds $\hat{A}$ and $\hat{B}$ can be selected through simulations so that the sequential test satisfies the two constrains defined in (14).

For example, as illustrated in FIG. 5, at 530, fusion center 300 can determine whether $\hat{L}_t$ is within interval $(-\hat{B}, \hat{A})$. For example, hardware processor 330 can compare the combined running LLR $\hat{L}_t$ with two threshold $-\hat{B}$ and $\hat{A}$ and determine whether $\hat{L}_t$ is between the two thresholds. In response to determining that $\hat{L}_t$ is within the interval $(-\hat{B}, \hat{A})$, hardware processor 330 can increment the time index n and process 500 can loop back to 510.

Alternatively, in response to determining that $\hat{L}_t$ is not within the interval $(-\hat{B}, \hat{A})$, hardware processor 330 can determine whether $\hat{L}_t$ is greater than or equal to threshold $\hat{A}$ or less than or equal to threshold $-\hat{B}$ at 550. In response to determining that $\hat{L}_t$ is greater than or equal to threshold $\hat{A}$, hardware processor 330 can determine that a signal of interest is present at 560. Alternatively, in response to determining that $\hat{L}_t$ is less than or equal to $-\hat{B}$, hardware processor 330 can determine that a signal of interest is absent at 570.

Next, at 580, fusion center 300 can inform all secondary users about the combined decision on the presence of the signal of interest through transceiver 320 and antennas 310.

It should be understood that some of the above steps of the flow diagram of FIG. 5 can be executed or performed in an order or sequence other than the order and sequence shown and described in the figure. Also some of the above steps of the flow diagram of FIG. 5 may be executed or performed well in advance of other steps, or may be executed or performed substantially simultaneously or in parallel to reduce latency and processing times.

Figure 6:
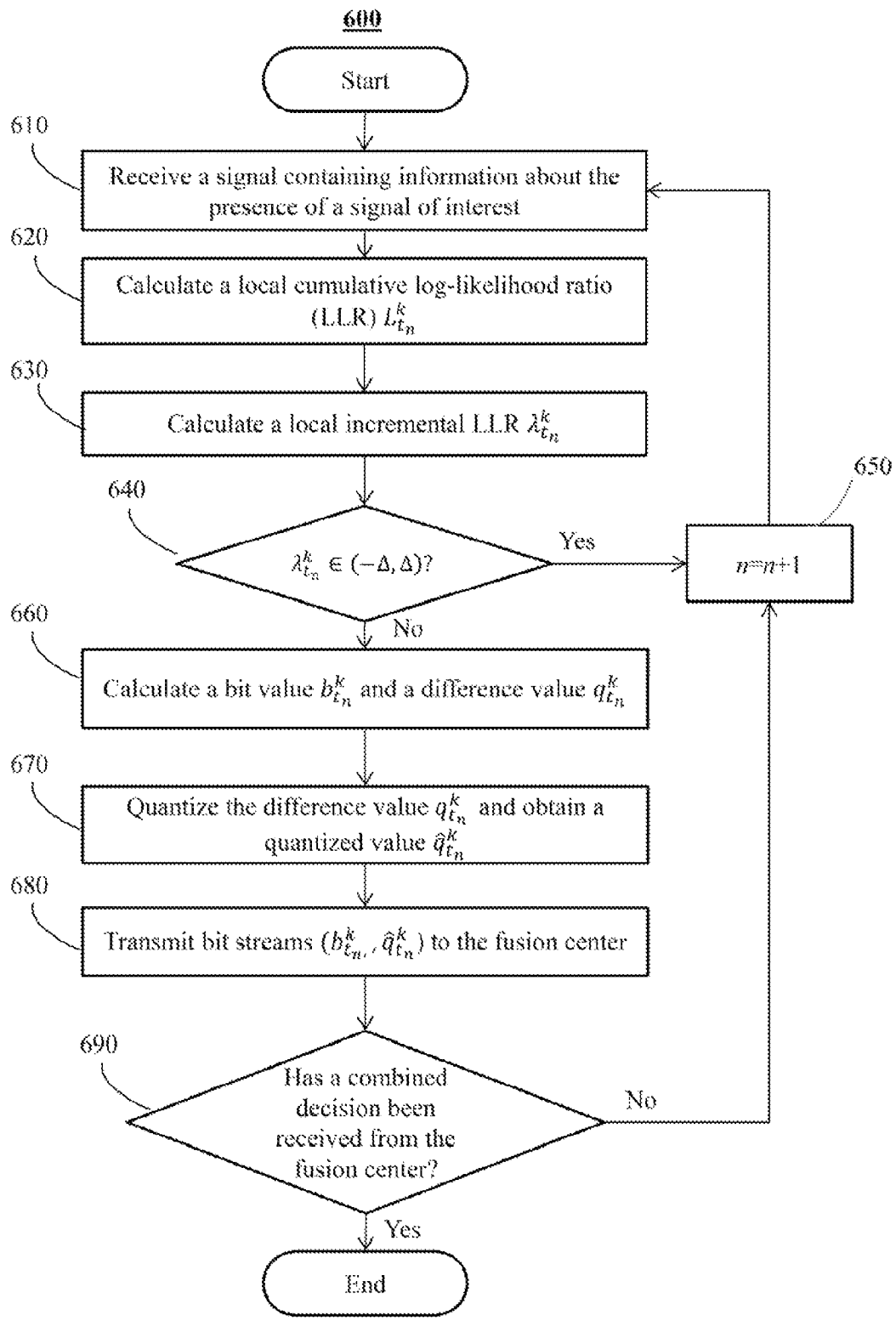
FIG. 6 is a flow chart of an example of a process for detecting a signal of interest at a secondary user using a randomized level-triggered sequential probability ratio test in accordance with some embodiments of the disclosed subject matter.

Turning to FIG. 6, a flowchart of an example of a process for detecting a signal of interest using a randomized level-triggered sequential probability ratio test (SPRT) in accordance with some embodiments is shown. In some embodiments, process 600 can be implemented by a secondary user shown in FIGS. 1 and 2.

Process 600 can begin by receiving a signal containing information about the presence of a signal of interest at 610. Step 610 can be performed in substantially the same manner as step 410 of FIG. 4. Process 600 can then be advanced to 620 and 630, which can be performed in substantially the same manner as 420 and 430 of FIG. 4, respectively.

At 640, secondary user 200 can determine whether $\lambda_n^k$ is within the interval $(-\Delta, \Delta)$. In response to determining that $\lambda_n^k$ is within the interval $(-\Delta, \Delta)$, hardware processor 230 can increment the time index n at 650, and then loop back to 610.

Alternatively, in response to determining that $\lambda_n^k$ is not within the interval $(-\Delta, \Delta)$, hardware processor 230 can calculate a bit value $b_n^k$ which can represent whether the incremental LLR $\lambda_n^k$ overshoots the upper threshold $\Delta$ or undershoots the lower threshold $-\Delta$. Hardware processor 230 can also calculate a difference value $q_n^k$ which can correspond to the absolute value of the overshoot or undershoot. For example, hardware processor 230 can calculate $q_n^k$ using the following equation:

$$q_n^k \triangleq |\lambda_n^k| - \Delta. \tag{33}$$

As described above in connection with FIG. 4, hardware processor 230 can calculate a bit value $b_n^k$ based on comparison of $\lambda_n^k$ and $\pm\Delta$. More particularly, for example, $b_n^k$ can be equal to +1 when hardware processor 230 determines that $\lambda_n^k$ is equal to or greater than the upper boundary $\Delta$. Alternatively, $b_n^k$ can be equal to −1 when hardware processor 230 determines that $\lambda_n^k$ is equal to or less than the lower boundary $-\Delta$. Alternatively, hardware processor 230 can calculate a bit value $b_n^k$ using equation (24) as described above.

At 670, secondary user 200 can quantize the difference value $q_n^k$ and obtain a quantized value $\hat{q}_n^k$. In some embodiments, the difference value $q_n^k$ cannot exceed the absolute value of the last observed LLR increment $|L_{t_n}^k|$. The LLR of each observation can be uniformly bound across time and secondary users. For the purpose of illustration, it can be assumed that $|l_t^k| < \Phi < \infty$ for all t, k in equation (17). Based on equation (33), it can be concluded that $q_n^k \le |l_t^k|$ and $0 \le q_n^k < \Phi$. In some embodiments, hardware processor 230 can divide the interval $[0, \Phi)$ uniformly into $\hat{r}$ subintervals $$[(m-1), m)\frac{\Phi}{\hat{r}}, m = 1, \ldots, \hat{r}. \text{ For } q_n^k \in [(m-1), m)\frac{\Phi}{\hat{r}},$$

hardware processor 230 can quantize $q_n^k$ either with the lower or the upper end of the subinterval by selecting randomly between the two values. More particularly, for example, hardware processor 230 can compute $\hat{q}_n^k$ based on the following randomized quantization rule:

$$\hat{q}_n^k = \tag{34}$$

$$\begin{cases} \left\lfloor \frac{q_n^k \hat{r}}{\phi} \right\rfloor \frac{\phi}{\hat{r}}, \text{ with probability } p = \dfrac{1 - \exp\left(q_n^k - \left(\left\lfloor \frac{q_n^k \hat{r}}{\phi} \right\rfloor + 1\right)\frac{\phi}{\hat{r}}\right)}{1 - \exp\left(-\frac{\phi}{\hat{r}}\right)}, \\ \left(\left\lfloor \frac{q_n^k \hat{r}}{\phi} \right\rfloor + 1\right)\frac{\phi}{\hat{r}}, \text{ with probability } 1 - p = \dfrac{\exp\left(q_n^k - \left\lfloor \frac{q_n^k \hat{r}}{\phi} \right\rfloor \frac{\phi}{\hat{r}}\right) - 1}{\exp\left(\frac{\phi}{\hat{r}}\right) - 1}. \end{cases}$$

In some embodiments, the quantized value $\hat{q}_n^k$ as defined in equation (34) may have the following property:

$$E\left[e^{\pm b_n^k(\Delta + \hat{q}_n^k)} \mid b_n^k, q_n^k\right] \le e^{\pm b_n^k(\Delta + q_n^k)} = e^{\pm(L_{t_n}^k - L_{t_{n-1}}^k)}, \tag{35}$$

where, $E[\cdot]$ denotes the expectation with respect to the randomization probabilities.

In some embodiments, for a given $q_n^k$, the quantized value $\hat{q}_n^k$ can take the values defined in equation (34) with probabilities p and 1−p respectively. For the purpose of illustration, the common length of the subintervals can be defined as $$\hat{\epsilon} = \frac{\phi}{\hat{r}}.$$

In accordance with some embodiments, it can be assumed that $(m-1)\hat{\epsilon} \le q_n^k < m\hat{\epsilon}$, $m = 1, \ldots, \hat{r}$. Thus, the quantized value $\hat{q}_n^k$ can take the two end values with probabilities p and 1−p respectively.

In some embodiments, the value of p can be selected by solving the following inequality:

$$pe^{\pm b_n^k(\Delta + (m-1)\hat{\epsilon})} + (1-p)e^{\pm b_n^k(\Delta + m\hat{\epsilon})} \le e^{\pm b_n^k(\Delta + q_n^k)}, \tag{36}$$

In some embodiments, $b_n^k$ can be a sign bit. Thus, inequality (36) can be written as follows:

$$pe^{\pm(m-1)\hat{\epsilon}} + (1-p)e^{\pm m\hat{\epsilon}} \le e^{\pm q_n^k} \tag{37}$$

from which, we can conclude:

$$p = \min\left\{\frac{e^{-me^{-m\hat{\epsilon}}} - e^{-q_n^k}}{e^{-m\hat{\epsilon}} - e^{-(m-1)\hat{\epsilon}}}, \frac{e^{m\hat{\epsilon}} - e^{q_n^k}}{e^{m\hat{\epsilon}} - e^{(m-1)\hat{\epsilon}}}\right\}. \tag{38}$$

In some embodiments, the second ratio in equation (38) is smaller than the first ratio. The secondary user can define p to have the value of the second ratio, i.e., $$\frac{e^{m\hat{\epsilon}} - e^{q_n^k}}{e^{m\hat{\epsilon}} - e^{(m-1)\hat{\epsilon}}}.$$

In some embodiments, the approximation in the incremental LLR $L_{t_n}^k - L_{t_{n-1}}^k$ can induce an equivalent approximation for the increment LLR $\exp(L_{t_n}^k - L_{t_{n-1}}^k)$. The value of p can be selected so that the incremental LLR, in average (over the randomization), does not exceed the exact incremental LLR. Alternatively, the value of p can be selected so that the average of the approximation of the incremental LLR matches the exact LLR value.

At 680, secondary user 200 can transmit the bit value $b_n^k$ and the quantized value $\hat{q}_n^k$ to fusion center 130 through transceiver 220 and antennas 210. For example, secondary user 200 can transmit a pair $\{b_n^k, \hat{q}_{t_n}^k\}$ at a sequence of random times $\{t_n^k\}$. As described above in connection with FIG. 4, $\{t_n^k\}$ can be defined by equation (24) or equation (25). In some embodiments, secondary user 200 can transmit a quantized value $\hat{q}_n^k$ when $q_n^k$ is into one of the $\hat{r}$ subintervals. More particularly, for example, secondary user 200 can transmit $\hat{r}+1$ different messages corresponding to the values $$m\frac{\Phi}{\hat{r}}, m = 1, \ldots, \hat{r}.$$

In some embodiments, secondary user 200 can combine the $\hat{r}+1$ messages with the bit value $b_n^k$. For example, secondary user 200 can transmit a total of $2(\hat{r}+1)$ possible messages. In a more particular example, secondary user 200 can transmit the bit value $b_n^k$ and the quantized value $\hat{q}_n^k$ using $\log_2 2(\hat{r}+1) = 1 + \log_2 \hat{r}+1$ bits. In some embodiments, the fusion center can have the list of all $2(\hat{r}+1)$ quantized values and secondary user 200 can transmit only an index value.

Next, at 690, secondary user 200 can determine whether a combined decision on the presence of the signal of interest has been received from the fusion center. In response to determining that a combined decision has not been received from the fusion center, secondary user 200 can increment the time index n at 650, and then loop back to 610. Alternatively, in response to determining that a combined decision has been received from the fusion center, process 600 can end.

It should be understood that some of the above steps of the flow diagram of FIG. 6 can be executed or performed in an order or sequence other than the order and sequence shown and described in the figure. Also some of the above steps of the flow diagram of FIG. 6 may be executed or performed well in advance of other steps, or may be executed or performed substantially simultaneously or in parallel to reduce latency and processing times.

Figure 7:
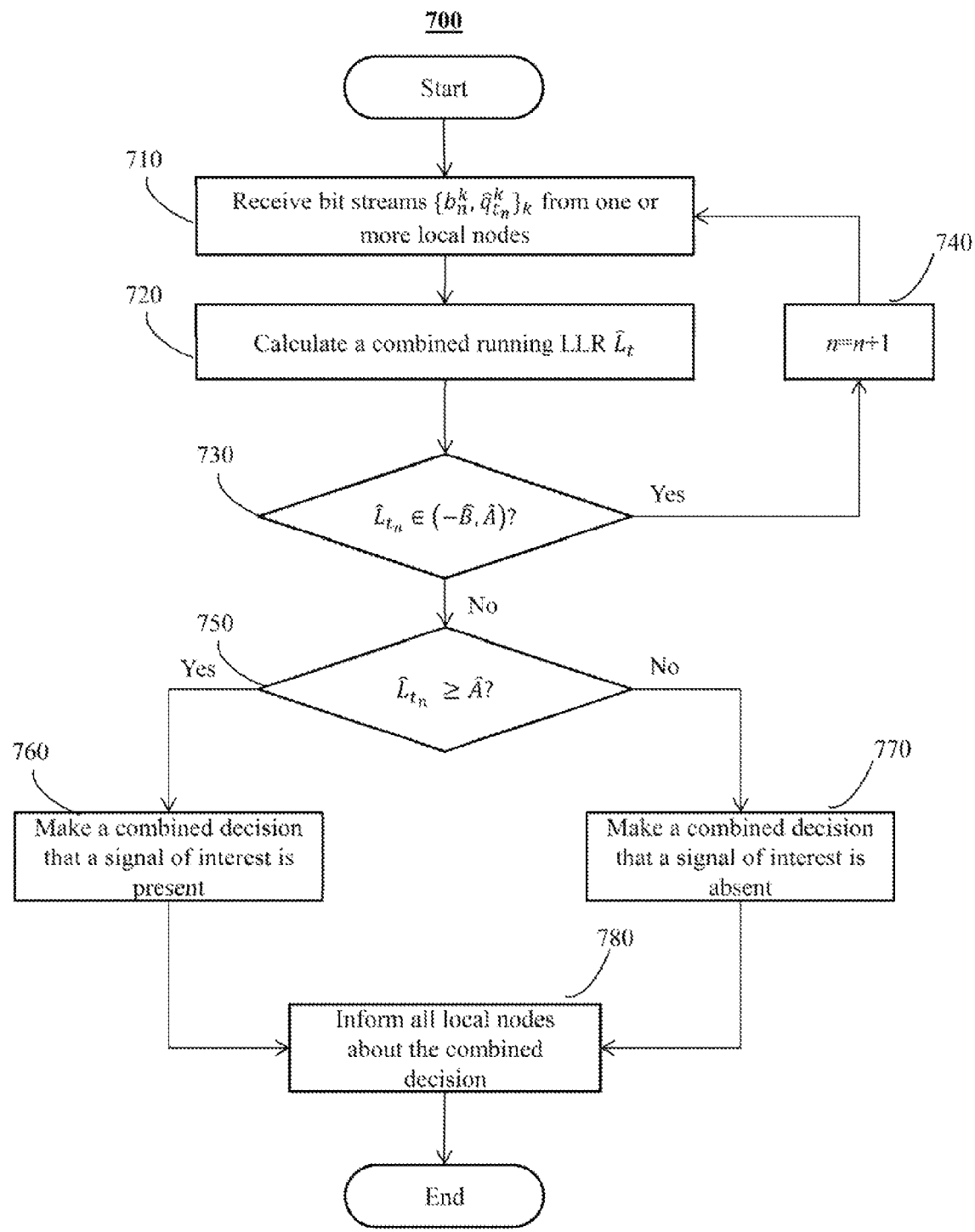
FIG. 7 is a flow chart of an example of a process for detecting a signal of interest at a fusion center using a randomized level-triggered sequential probability ratio test in accordance with some embodiments of the disclosed subject matter.

Turning to FIG. 7, a flow chart of an example of a process for determining the presence of a signal of interest using a randomized level-triggered sequential probability ratio test in accordance with some embodiments of the disclosed subject matter is shown. In some embodiments, process 700 can be implemented by a fusion center as illustrated in FIGS. 1 and 3.

Process 700 can begin by receiving bit streams $\{b_n^k, \hat{q}_{t_n}^k\}_k$ from one or more secondary users. For example, fusion center 130 can asynchronously receive bit streams $\{b_n^k, \hat{q}_{t_n}^k\}_k$ from K multiple secondary users through antennas 310 and transceiver 320. In some embodiments, at a particular time instant, fusion center 300 can receive multiple bit streams $\{b_n^k, \hat{q}_{t_n}^k\}_k$ from multiple secondary users.

Next, at 720, fusion center 300 can calculate a combined running LLR. For example, hardware processor 330 can calculate a combined running LLR based on bit value $b_n^k$ and quantized value $\hat{q}_{t_n}^k$. In some embodiments, equation (31) can be converted into $\lambda_n^k = b_n^k(\Delta + q_n^k)$. Thus, hardware processor 330 can approximate $\lambda$ as $\hat{\lambda}_n^k$ using the following equation:

$$\hat{\lambda}_n^k = b_n^k(\Delta + \hat{q}_n^k). \tag{34}$$

Hardware processor 330 can also calculate a combined running LLR using the following equation:

$$\hat{L}_{t_n}^k = \hat{L}_{t_{n-1}}^k + b_n^k(\Delta + \hat{q}_n^k). \tag{35}$$

In some embodiments, at time instant $t_n$, fusion center 300 can receive information $(b_n, \hat{q}_n)$ from multiple secondary users. Fusion center 300 can then calculate a combined running LLR using the following equations:

$$\hat{L}_{t_n} = \hat{L}_{t_{n-1}} + b_n(\Delta + \hat{q}_n). \tag{36}$$

In some embodiments, hardware processor 330 can hold the value of the combined running LLR constant until it receives new bit streams from one or more secondary users.

At 730, fusion center 300 can determine whether $\hat{L}_{t_n}$ is within the interval $(-\hat{B}, \hat{A})$. In response to determining that $\hat{L}_{t_n}$ is within interval $(-\hat{B}, \hat{A})$, hardware processor 330 can increment the time index n at 740, and then loop back to 710. Fusion center 300 can receive new bit streams from one or more secondary users at 710.

Alternatively, in response to determining that $\hat{L}_{t_n}$ is not within interval $(-\hat{B}, \hat{A})$, hardware processor 330 can determine whether $\hat{L}_{t_n}$ is greater than or equal to threshold $\hat{A}$ or less than or equal to $-\hat{B}$ at 750. In response to determining that $\hat{L}_t$ is greater than or equal to threshold $\hat{A}$, hardware processor 330 can determine that a signal of interest is present at 760. Alternatively, in response to determining that $\hat{L}_{t_n}$ is less than or equal to $-\hat{B}$, hardware processor 330 can determine that a signal of interest is absent at 770.

Next, at 780, fusion center 300 can inform all secondary users about the combined decision on the presence of the signal of interest through transceiver 320 and antennas 310.

It should be understood that some of the above steps of the flow diagram of FIG. 7 can be executed or performed in an order or sequence other than the order and sequence shown and described in the figure. Also some of the above steps of the flow diagram of FIG. 7 may be executed or performed well in advance of other steps, or may be executed or performed substantially simultaneously or in parallel to reduce latency and processing times.

Although FIGS. 5-7 are described herein in connection with a symmetric interval $(\Delta, -\Delta)$, this is only illustrative. For example, the symmetric interval can be replaced with any suitable interval. In a more particular example, instead of using $(\Delta, -\Delta)$, the kth secondary user can use $(-\Delta_1^k, \Delta_2^k)$ to detect a signal of interest, where $\Delta_1^k, \Delta_2^k > 0$ and $\Delta_1^k \neq \Delta_2^k$. In some embodiments, K secondary users can use different thresholds $\{\Delta_i^k\}$ to define the interval, where $i=1, 2$, and $k=1, \ldots, K$. Thus, the fusion center can determine a combined running LLR based on multiple thresholds $\{\Delta_i^k\}$ received from the secondary users.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of embodiment of the invention can be made without departing from the spirit and scope of the invention, which is only limited by the claims which follow. Features of the disclosed embodiments can be combined and rearranged in various ways.

What is claimed is:

1. A system for determining whether a signal of interest is present, comprising:
   at least one hardware processor that is configured to:
   receive at least one bit value containing information about whether the signal of interest is present from at least one transmitter, wherein the at least one bit value is transmitted from the at least one transmitter at a set of random time instances, wherein the at least one bit value is calculated without performing quantization, and wherein the set of random time instances are determined by performing a sequential probability ratio test that comprises:
   calculating a local incremental log-likelihood ratio based on a signal containing information about the presence of the signal of interest; and
   determining whether the local incremental log-likelihood ratio is within a second predetermined range;
   receive at least one quantized value containing information about whether the local incremental log-likelihood ratio is within the second predetermined range;

calculate a combined log-likelihood ratio based at least in part on the at least one bit value; and
determine whether the signal of interest is present based at least in part on the combined log-likelihood ratio.

2. The system of claim 1, wherein the at least one hardware processor is further configured to determine whether the combined log-likelihood ratio is within a first predetermined range.

3. The system of claim 1, wherein the at least one hardware processor is further configured to calculate a combined log-likelihood ratio based on the at least one bit value and the at least one quantized value.

4. A method for determining whether a signal of interest is present, the method comprising:
receiving at least one bit value containing information about whether the signal of interest is present from at least one transmitter, wherein the at least one bit value is transmitted from the at least one transmitter at a set of random time instances, wherein the at least one bit value is calculated without performing quantization, and wherein the set of random time instances are determined by performing a sequential probability ratio test that comprises:
calculating a local incremental log-likelihood ratio based on a signal containing information about the presence of the signal of interest; and
determining whether the local incremental log-likelihood ratio is within a second predetermined range;
receiving at least one quantized value containing information about whether the local incremental log-likelihood ratio is within the second predetermined range;
calculating, using a hardware processor, a combined log-likelihood ratio based at least in part on the at least one bit value; and
determining whether the signal of interest is present based at least in part on the combined log-likelihood ratio.

5. The method of claim 4, further comprising determining whether the combined log-likelihood ratio is within a first predetermined range.

6. The method of claim 4, further comprising calculating a combined log-likelihood ratio based on the at least one bit value and the at least one quantized value.

7. A non-transitory computer-readable medium containing computer-executable instructions that, when executed by a processor, cause the processor to perform a method for determining whether a signal of interest is present, the method comprising:
receiving at least one bit value containing information about whether the signal of interest is present from at least one transmitter, wherein the at least one bit value is transmitted from the at least one transmitter at a set of random time instances, wherein the at least one bit value is calculated without performing quantization, and wherein the set of random time instances are determined by performing a sequential probability ratio test that comprises:
calculating a local incremental log-likelihood ratio based on a signal containing information about the presence of the signal of interest; and
determining whether the local incremental log-likelihood ratio is within a second predetermined range;
receiving at least one quantized value containing information about whether the local incremental log-likelihood ratio is within the second predetermined range;
calculating a combined log-likelihood ratio based at least in part on the at least one bit value; and
determining whether the signal of interest is present based at least in part on the combined log-likelihood ratio.

8. The non-transitory computer-readable medium of claim 7, wherein the method further comprises determining whether the combined log-likelihood ratio is within a first predetermined range.

9. The non-transitory computer-readable medium of claim 7, wherein the method further comprises calculating a combined log-likelihood ratio based on the at least one bit value and the at least one quantized value.

10. A system for determining whether a signal of interest is present, comprising:
at least one hardware processor that is configured to:
receive a plurality of bit values containing information about whether the signal of interest is present from a plurality of transmitters, wherein each of the plurality of bit values is transmitted from one of the plurality of transmitters at a random time instance, and wherein each of the plurality of bit values is calculated without performing quantization;
calculate a combined log-likelihood ratio based at least in part on the plurality of bit values; and
determine whether the signal of interest is present based at least in part on the combined log-likelihood ratio.

11. The system of claim 10, wherein the at least one hardware processor is further configured to determine whether the combined log-likelihood ratio is within a first predetermined range.

12. The system of claim 10, wherein each random time instance is determined by performing a sequential probability ratio test.

13. The system of claim 12, wherein performing the sequential probability ratio test comprises:
calculating a local incremental log-likelihood ratio based on a signal containing information about the presence of the signal of interest; and
determining whether the local incremental log-likelihood ratio is within a second predetermined range.

14. The system of claim 13, wherein the at least one hardware processor is further configured to receive at least one quantized value containing information about whether the local incremental log-likelihood ratio is within the second predetermined range.

15. The system of claim 14, wherein the at least one hardware processor is further configured to calculate a combined log-likelihood ratio based on the plurality of bit values and the at least one quantized value.

16. A method for determining whether a signal of interest is present, the method comprising:
receiving a plurality of bit values containing information about whether the signal of interest is present from a plurality of transmitters, wherein each of the plurality of bit values is transmitted from one of the plurality of transmitters at a random time instance, and wherein each of the plurality of bit values is calculated without performing quantization;
calculating, using a hardware processor, a combined log-likelihood ratio based at least in part on the plurality of bit values; and
determining whether the signal of interest is present based at least in part on the combined log-likelihood ratio.

17. The method of claim 16, further comprising determining whether the combined log-likelihood ratio is within a first predetermined range.

18. The method of claim 16, wherein the set of random time instances are determined by performing a sequential probability ratio test.

19. The method of claim 18, wherein performing the sequential probability ratio test comprises:
   calculating a local incremental log-likelihood ratio based on a signal containing information about the presence of the signal of interest; and
   determining whether the local incremental log-likelihood ratio is within a second predetermined range.

20. The method of claim 19, further comprising receiving at least one quantized value containing information about whether the local incremental log-likelihood ratio is within the second predetermined range.

21. The method of claim 20, further comprising calculating a combined log-likelihood ratio based on the plurality of bit values and the at least one quantized value.

22. A non-transitory computer-readable medium containing computer-executable instructions that, when executed by a processor, cause the processor to perform a method for determining whether a signal of interest is present, the method comprising:
   receiving a plurality of bit values containing information about whether the signal of interest is present from a plurality of transmitters, wherein each of the plurality of bit values is transmitted from one of the plurality of transmitters at a random time instance, and wherein each of the plurality of bit values is calculated without performing quantization;
   calculating a combined log-likelihood ratio based at least in part on the plurality of bit values; and
   determining whether the signal of interest is present based at least in part on the combined log-likelihood ratio.

23. The non-transitory computer-readable medium of claim 22, wherein the method further comprises determining whether the combined log-likelihood ratio is within a first predetermined range.

24. The non-transitory computer-readable medium of claim 22, wherein the set of random time instances are determined by performing a sequential probability ratio test.

25. The non-transitory computer-readable medium of claim 24, wherein performing the sequential probability ratio test comprises:
   calculating a local incremental log-likelihood ratio based on a signal containing information about the presence of the signal of interest; and
   determining whether the local incremental log-likelihood ratio is within a second predetermined range.

26. The non-transitory computer-readable medium of claim 25, wherein the method further comprises receiving at least one quantized value containing information about whether the local incremental log-likelihood ratio is within the second predetermined range.

27. The non-transitory computer-readable medium of claim 26, wherein the method further comprises calculating a combined log-likelihood ratio based on the plurality of bit values and the at least one quantized value.

\* \* \* \* \*

UNITED STATES PATENT AND TRADEMARK OFFICE
CERTIFICATE OF CORRECTION

PATENT NO. : 9,479,372 B2
APPLICATION NO. : 14/383815
DATED : October 25, 2016
INVENTOR(S) : Yasin Yilmaz, Xiaodong Wang and George V. Moustakides Page 1 of 1

It is certified that error appears in the above-identified patent and that said Letters Patent is hereby corrected as shown below:

In the Specification

Column 1, Line 12 please add the following new paragraph and header:
--Statement Regarding Federally Sponsored Research Or Development
This invention was made with government support under 1064575 awarded by the National Science Foundation. The government has certain rights in the invention.--

Signed and Sealed this
Fifth Day of May, 2020

Andrei Iancu
*Director of the United States Patent and Trademark Office*